US011949276B2

(12) United States Patent
Patel et al.

(10) Patent No.: US 11,949,276 B2
(45) Date of Patent: *Apr. 2, 2024

(54) DUAL DRIVE ELECTRIC VEHICLE WITH UNLIMITED RANGE DRIVE CAPABILITIES

(71) Applicants: Mitul M Patel, Boca Raton, FL (US); Michael Andrew Generallo, Boca Raton, FL (US); Luna Yaisi Manuel, Davie, FL (US)

(72) Inventors: Mitul M Patel, Boca Raton, FL (US); Michael Andrew Generallo, Boca Raton, FL (US); Luna Yaisi Manuel, Davie, FL (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/445,599

(22) Filed: Aug. 21, 2021

(65) Prior Publication Data
US 2022/0014037 A1 Jan. 13, 2022

Related U.S. Application Data

(63) Continuation of application No. 17/302,454, filed on May 3, 2021.
(Continued)

(51) Int. Cl.
*H02J 7/00* (2006.01)
*B60L 50/60* (2019.01)
(Continued)

(52) U.S. Cl.
CPC ............ *H02J 7/1423* (2013.01); *B60L 50/62* (2019.02); *B60L 50/66* (2019.02); *B60L 53/14* (2019.02);
(Continued)

(58) Field of Classification Search
CPC ........ H02J 7/1423; B60L 50/14; B60L 50/62; B60L 50/66; B60L 53/22; B60L 53/24;
(Continued)

(56) References Cited

U.S. PATENT DOCUMENTS

2001/0035740 A1* 11/2001 Palanisamy ........... H02J 7/1446
320/147
2009/0242289 A1* 10/2009 Murty ................... B60W 10/08
475/5

(Continued)
*Primary Examiner* — Zixuan Zhou

(57) ABSTRACT

A system describing Unlimited Range Drive capabilities of electric vehicles using machine learning techniques, assisted by intelligent battery modules and high voltage continuous variable power plant, the intelligent battery and power plant modules work in harmony and continuously provide feedback to each other, causing a battery to recharge while the other is in use to drive, this charging/recharging process and dynamically switching battery in use is continued until physical life of batteries is exhausted approximately 10 to 15 years, dynamic coordination of modules with dynamic switching of batteries, achieves unlimited range drive capabilities which may exceed 1 million mile drive on a single high voltage battery charge, the system provides clean environment and cost effective solution, this platform can be implemented in larger chassis including, but not limited to light duty trucks and vans up to heavy duty cargo tractor trailer and commercial public transportation buses.

20 Claims, 31 Drawing Sheets

HIGH VOLTAGE LAYOUT

Related U.S. Application Data

(60) Provisional application No. 62/704,304, filed on May 4, 2020.

(51) Int. Cl.
| | |
|---|---|
| *B60L 50/62* | (2019.01) |
| *B60L 53/14* | (2019.01) |
| *B60L 53/22* | (2019.01) |
| *B60L 53/24* | (2019.01) |
| *B60L 58/12* | (2019.01) |
| *B60L 58/18* | (2019.01) |
| *B60L 58/20* | (2019.01) |
| *B60R 16/03* | (2006.01) |
| *B60R 16/033* | (2006.01) |
| *H02J 7/14* | (2006.01) |
| *B60L 53/12* | (2019.01) |

(52) U.S. Cl.
CPC ............. *B60L 53/22* (2019.02); *B60L 53/24* (2019.02); *B60L 58/12* (2019.02); *B60L 58/18* (2019.02); *B60L 58/20* (2019.02); *B60R 16/0307* (2013.01); *B60R 16/033* (2013.01); *B60L 53/12* (2019.02); *B60L 2220/42* (2013.01)

(58) Field of Classification Search
CPC .......... B60L 58/12; B60L 58/18; B60L 58/20; B60L 2220/42; B60R 16/0307; B60R 16/033
USPC ............................................ 320/109; 701/22
See application file for complete search history.

(56) References Cited

U.S. PATENT DOCUMENTS

| | | | |
|---|---|---|---|
| 2010/0006351 A1* | 1/2010 | Howard | B60L 50/60 180/2.2 |
| 2014/0012448 A1* | 1/2014 | Tripathi | B60L 53/60 320/108 |
| 2018/0009310 A1* | 1/2018 | Storm | B60W 30/18127 |
| 2019/0023136 A1* | 1/2019 | Lee | B60L 53/24 |

* cited by examiner

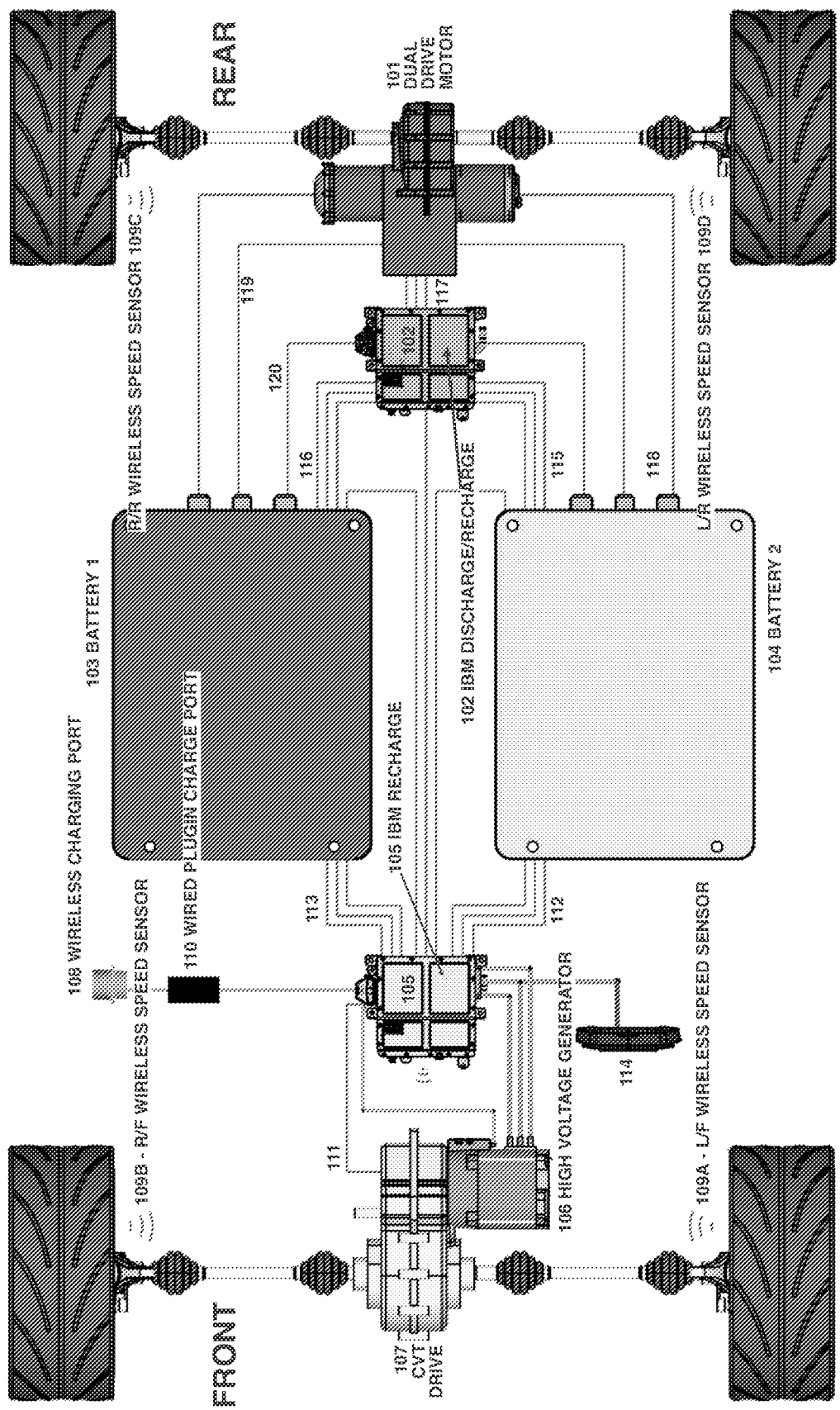
FIG. 1 HIGH VOLTAGE LAYOUT

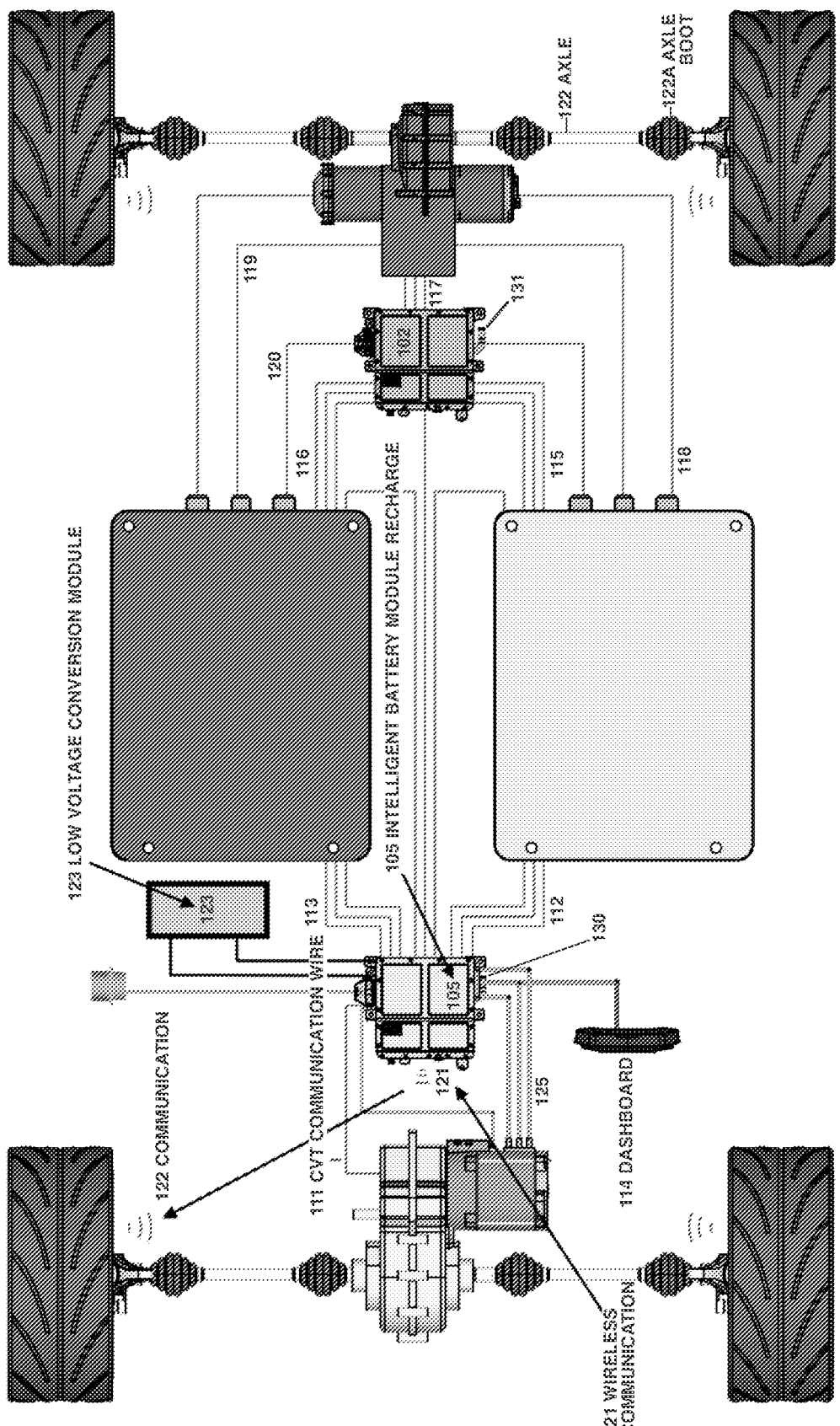
FIG. 2 LOW CONVERSION LAYOUT

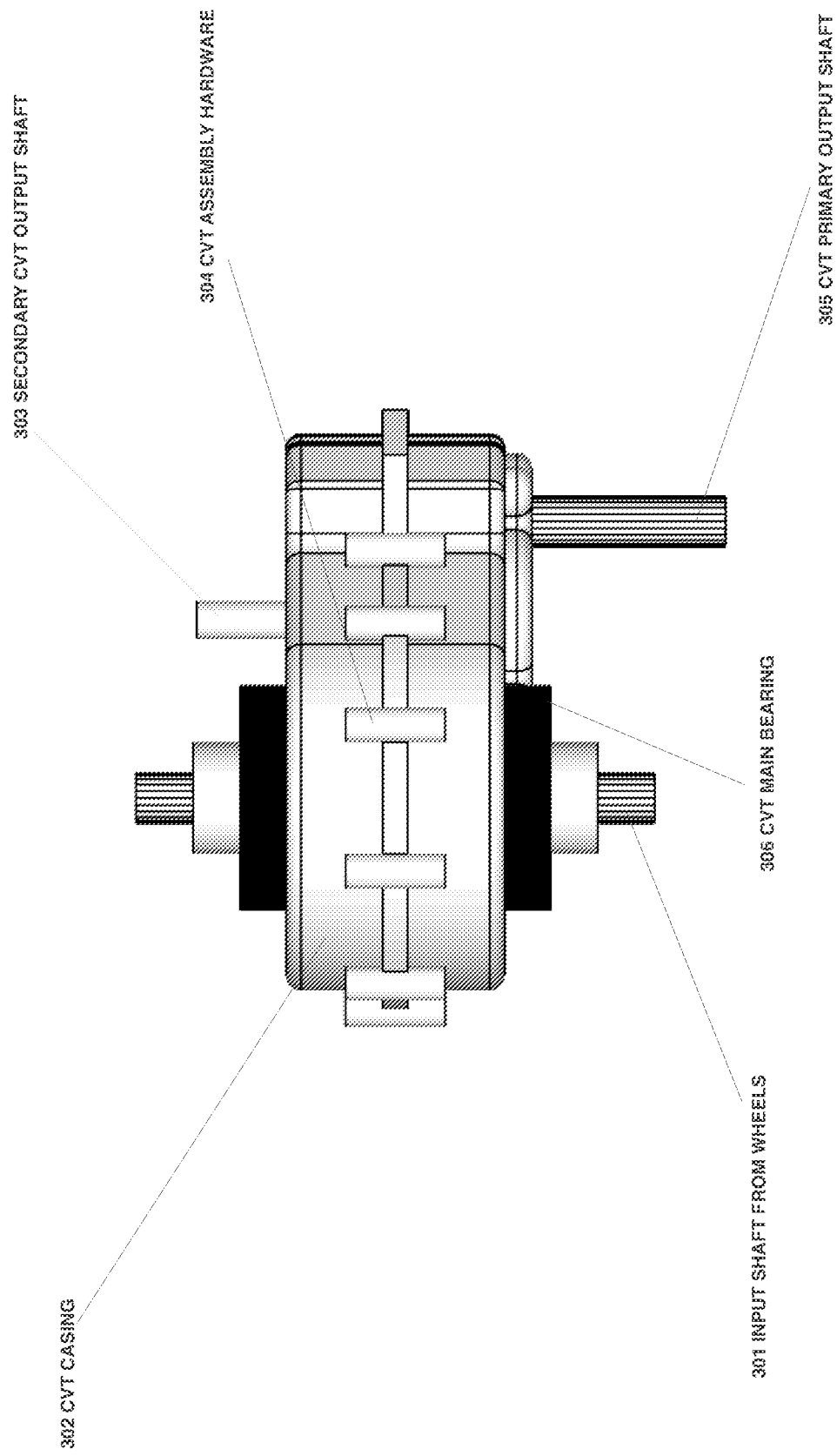
FIG. 3 CONTINUOUS VARIABLE TRANSMISSION (CVT)

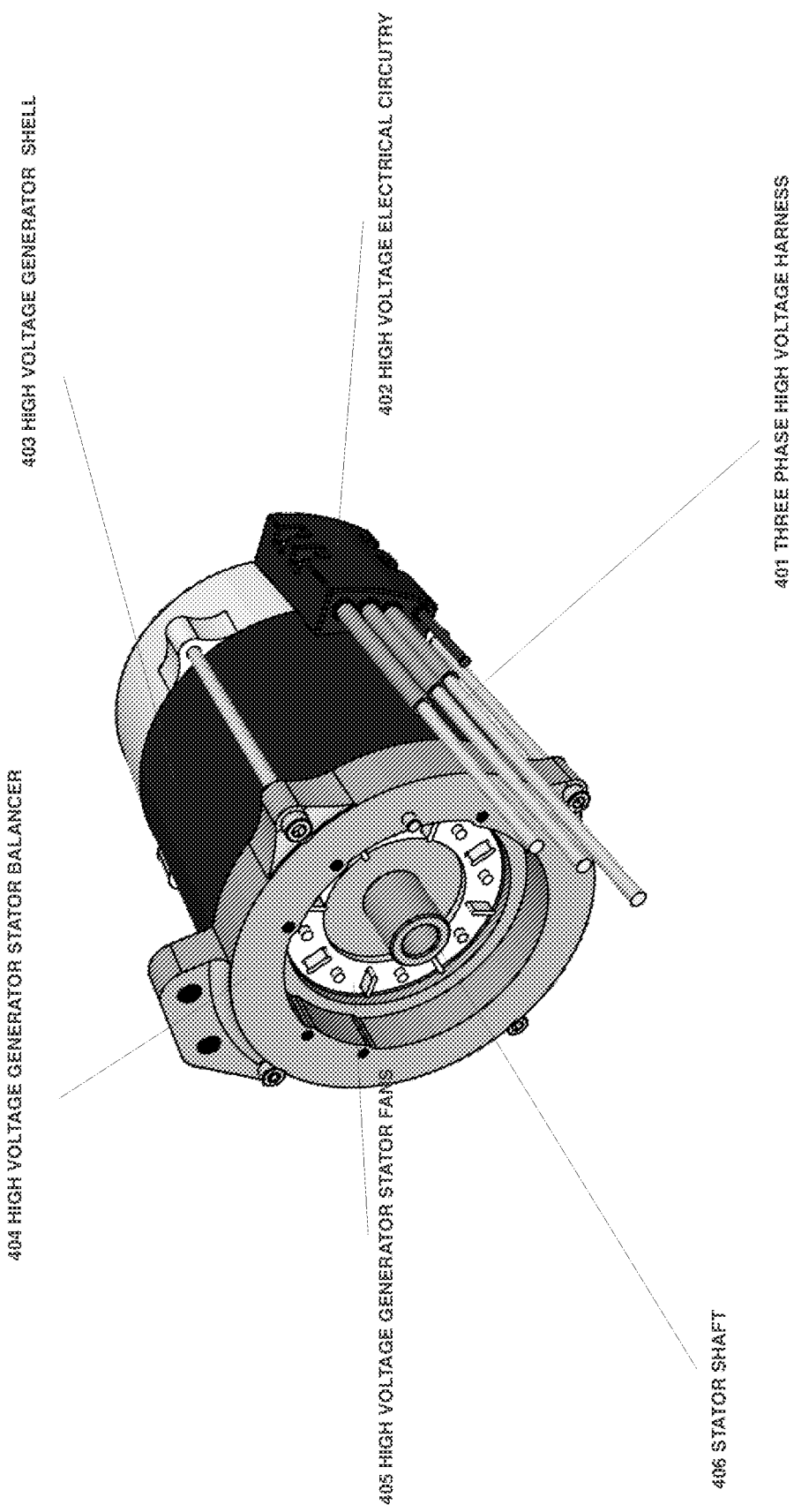
FIG. 4 THREE PHASE HIGH VOLTAGE GENERATOR

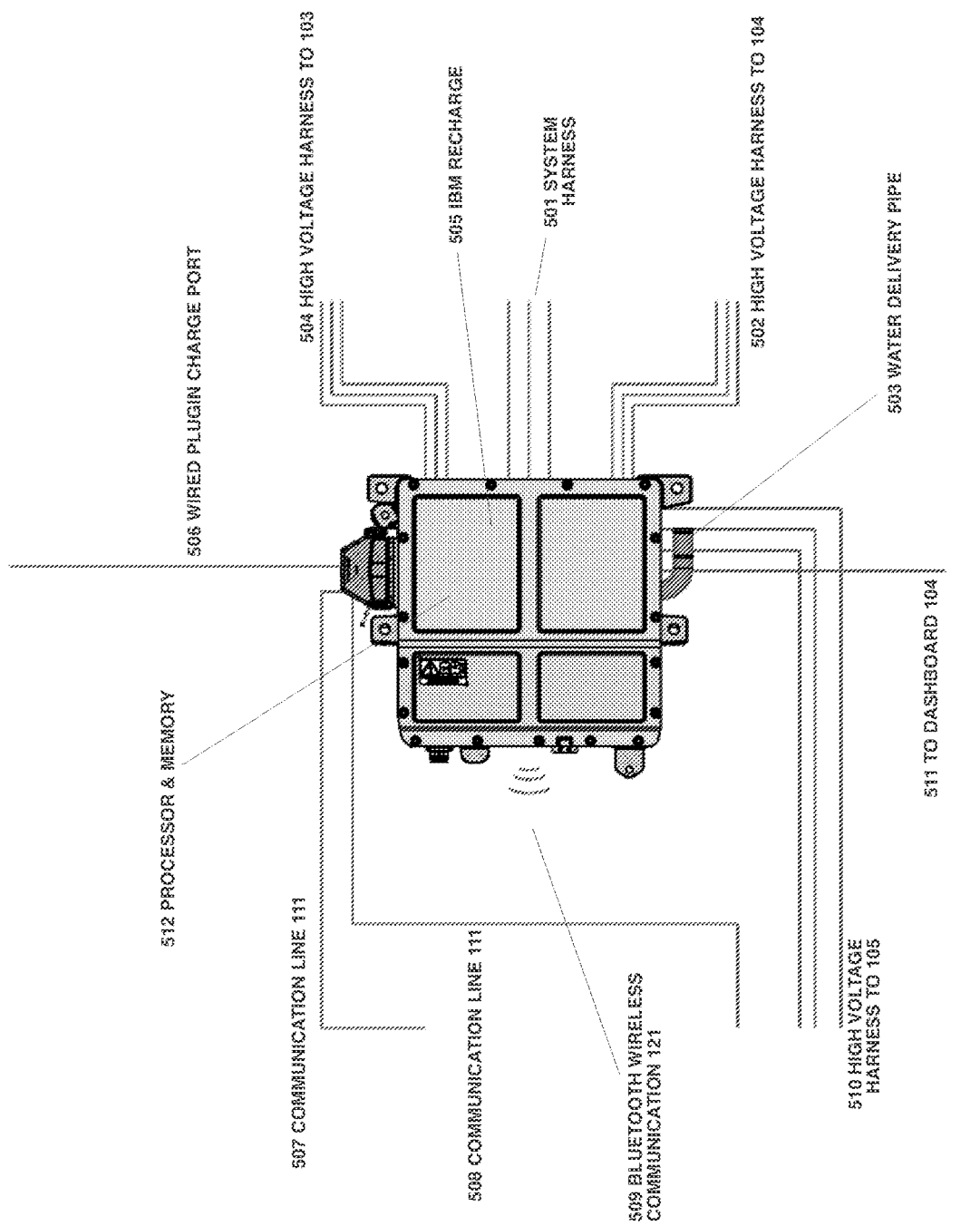
FIG. 5 INTELLIGENT BATTERY MODULE RECHARGE (IBM-R)

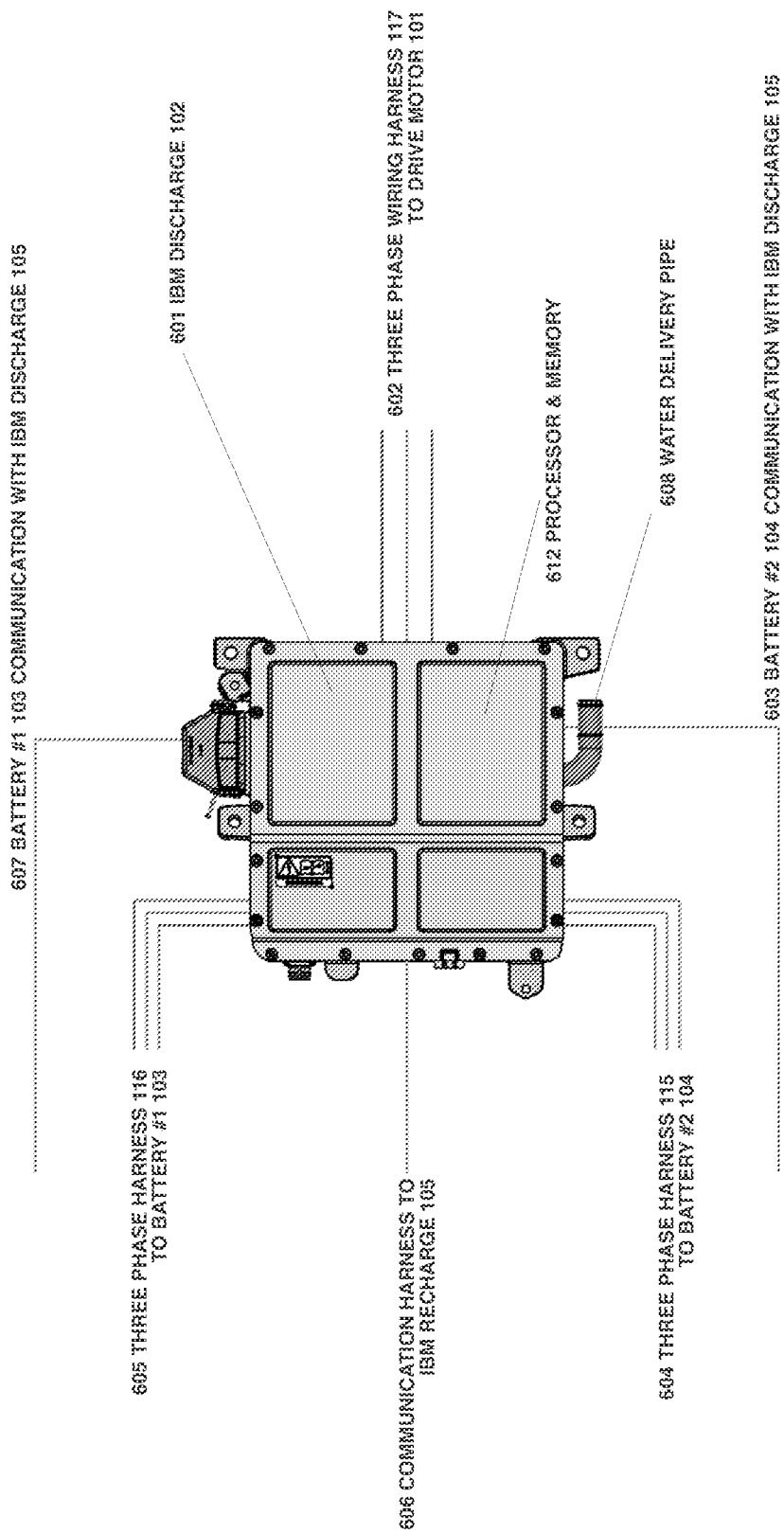
FIG. 6 INTELLIGENT BATTERY MODULE DISRECHARGE / RECHARGE (IBM-D/R)

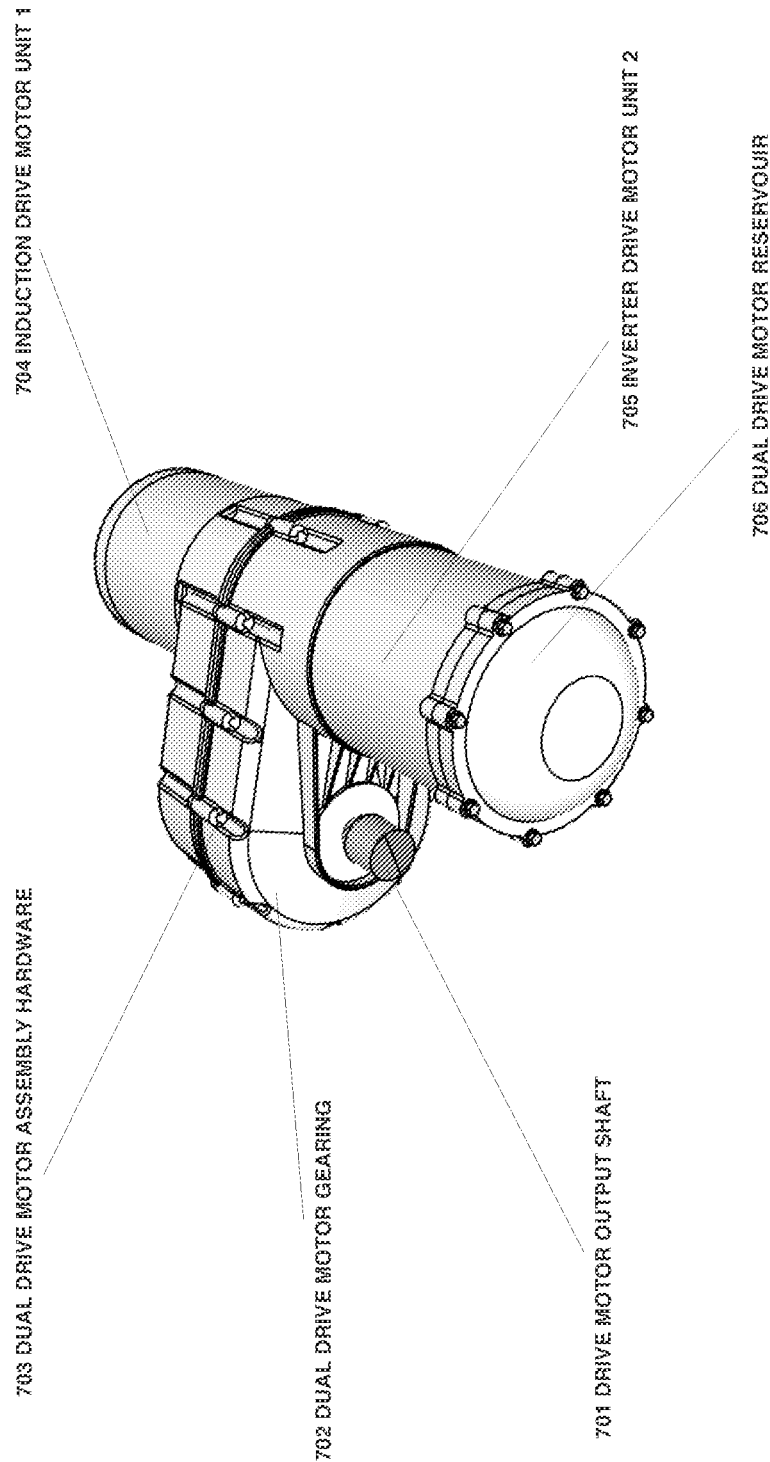
FIG. 7 DUAL DRIVE MOTOR

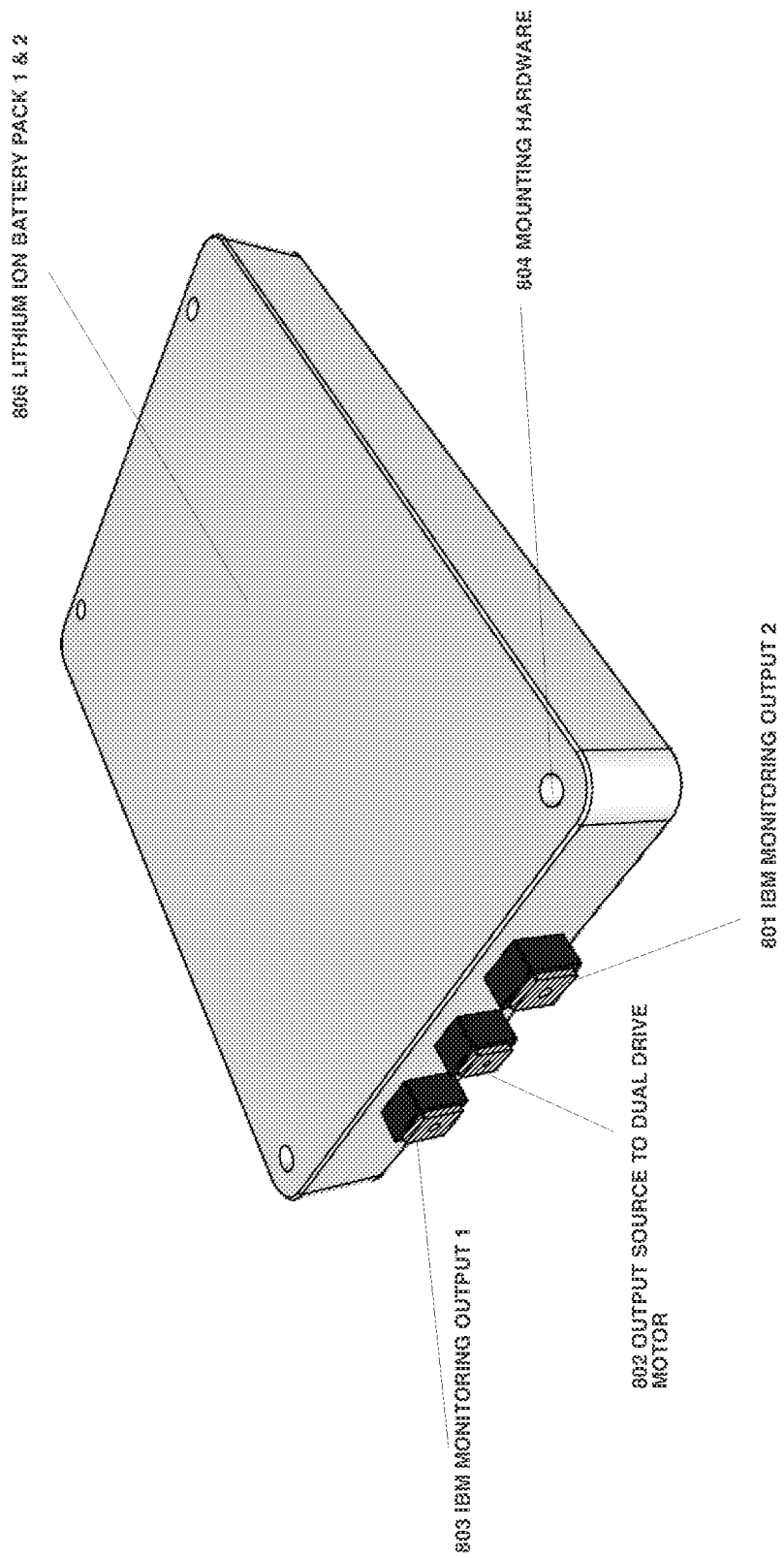
FIG. 8 HIGH VOLTAGE LITHIUM ION BATTERY

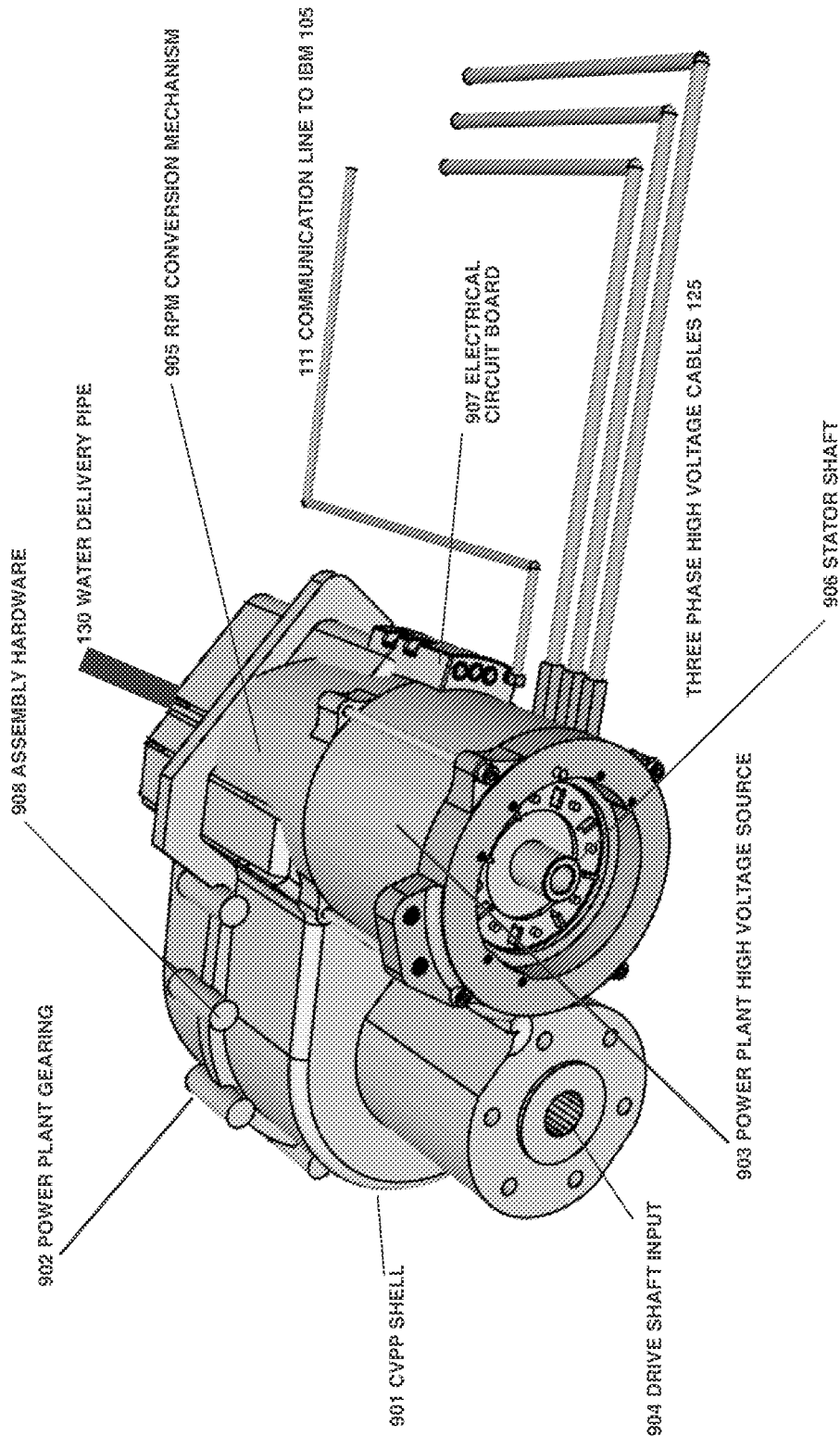
FIG. 9 CONTINUOUS VARIABLE POWER PLANT (CVPP)

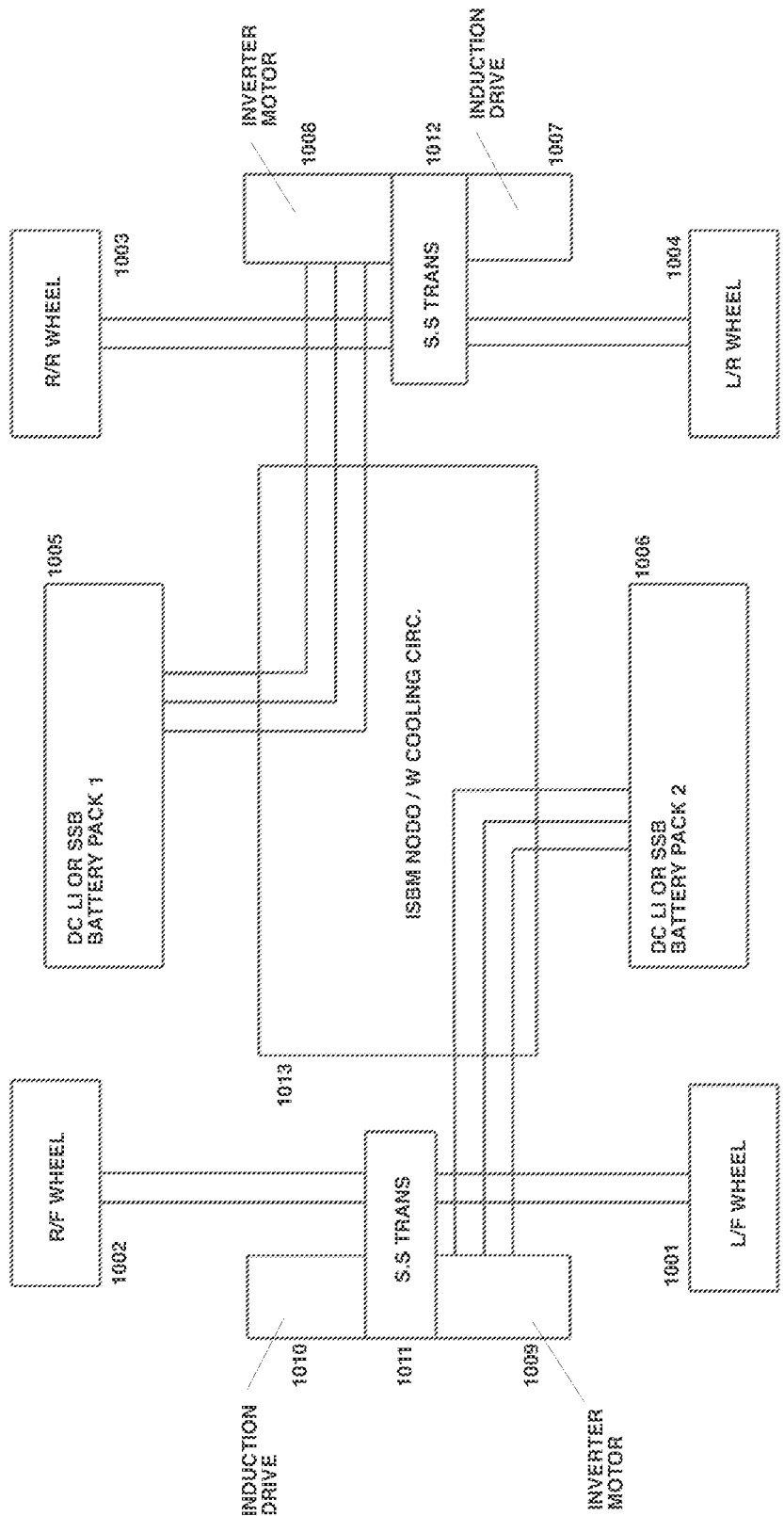
FIG. 10 DUAL DRIVE ELECTRIC VEHICLE (EV) WITH UNLIMITED RANGE DRIVE (URD) CAPABILITIES LAYOUT

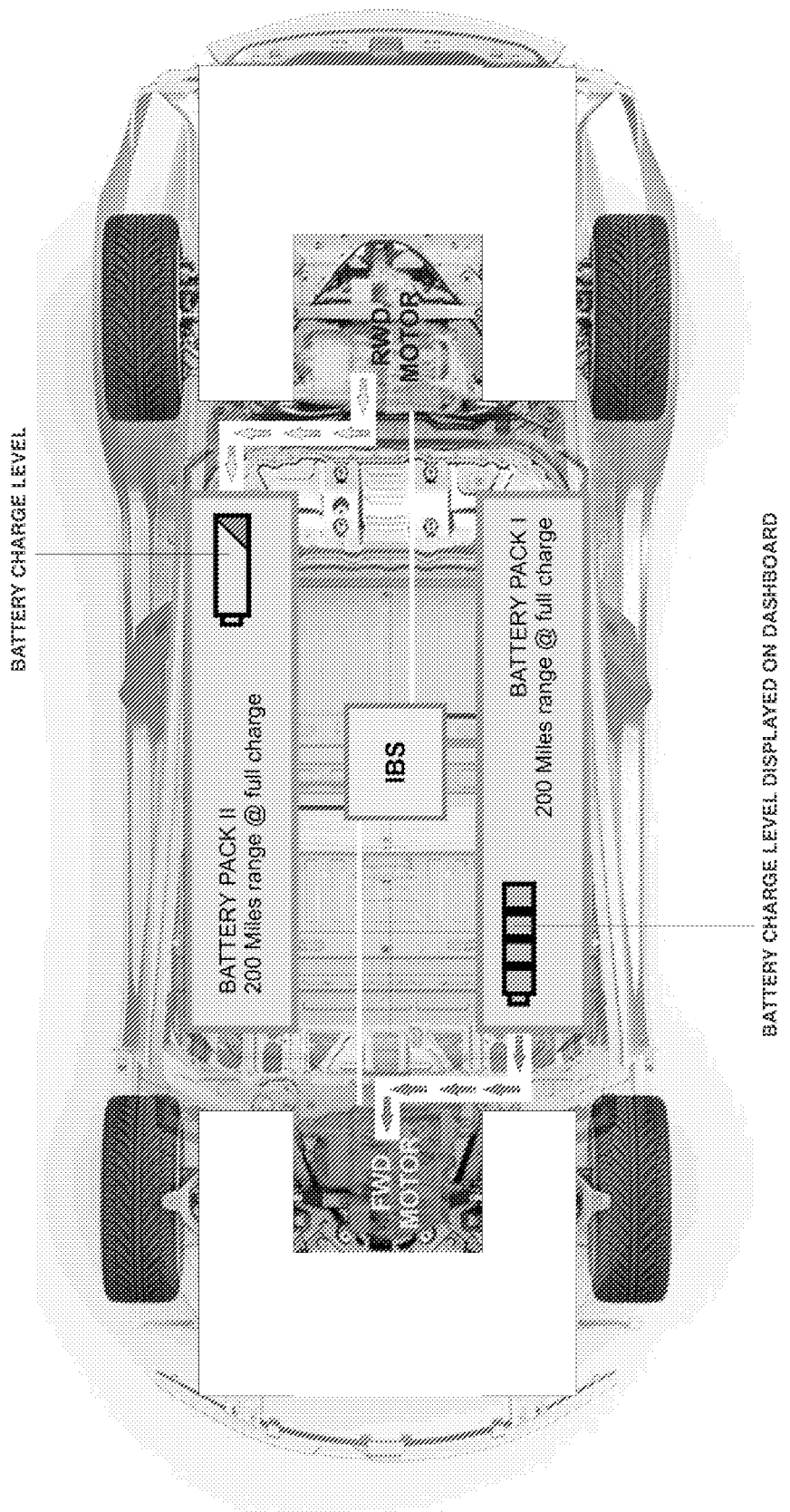
FIG. 11 BASIC COMPONENTS LAYOUT OF DYNAMIC UNLIMITED RANGE SYSTEM

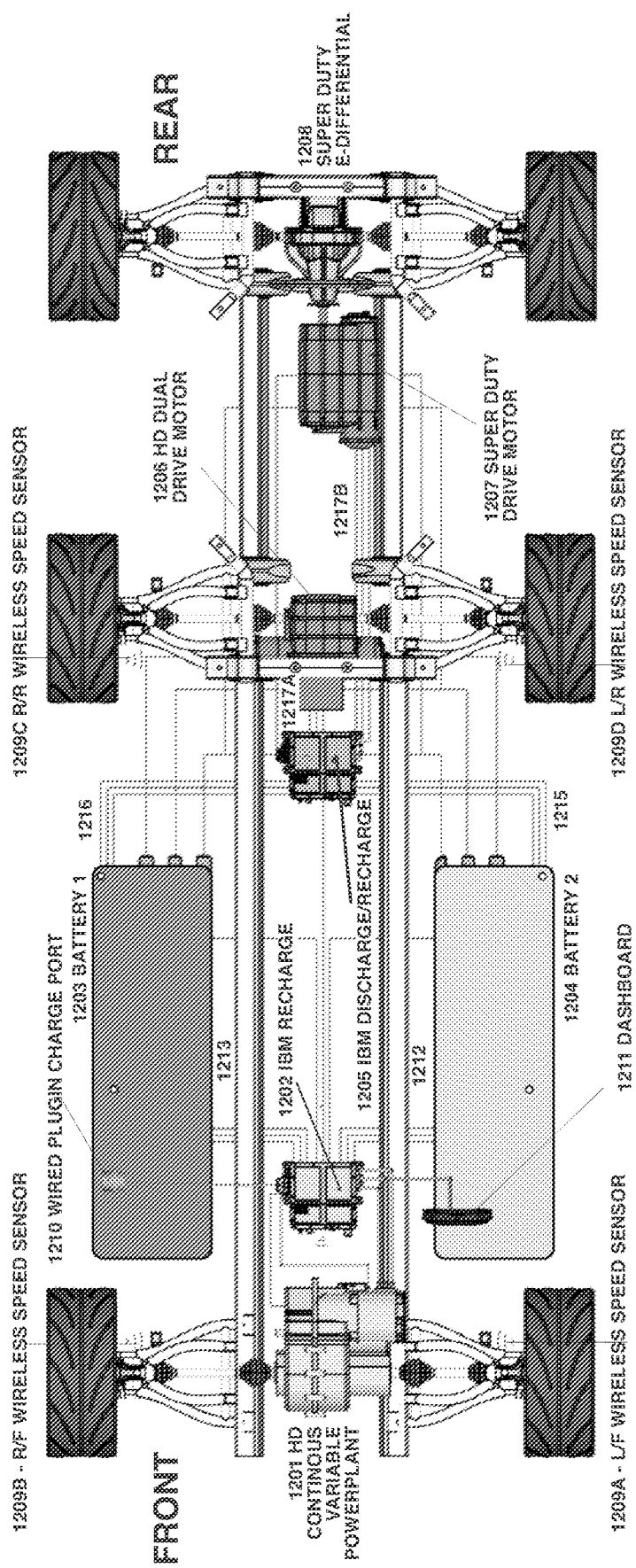
FIG. 12 HEAVY DUTY APPLICATION HIGH VOLTAGE LAYOUT (HD-URD)

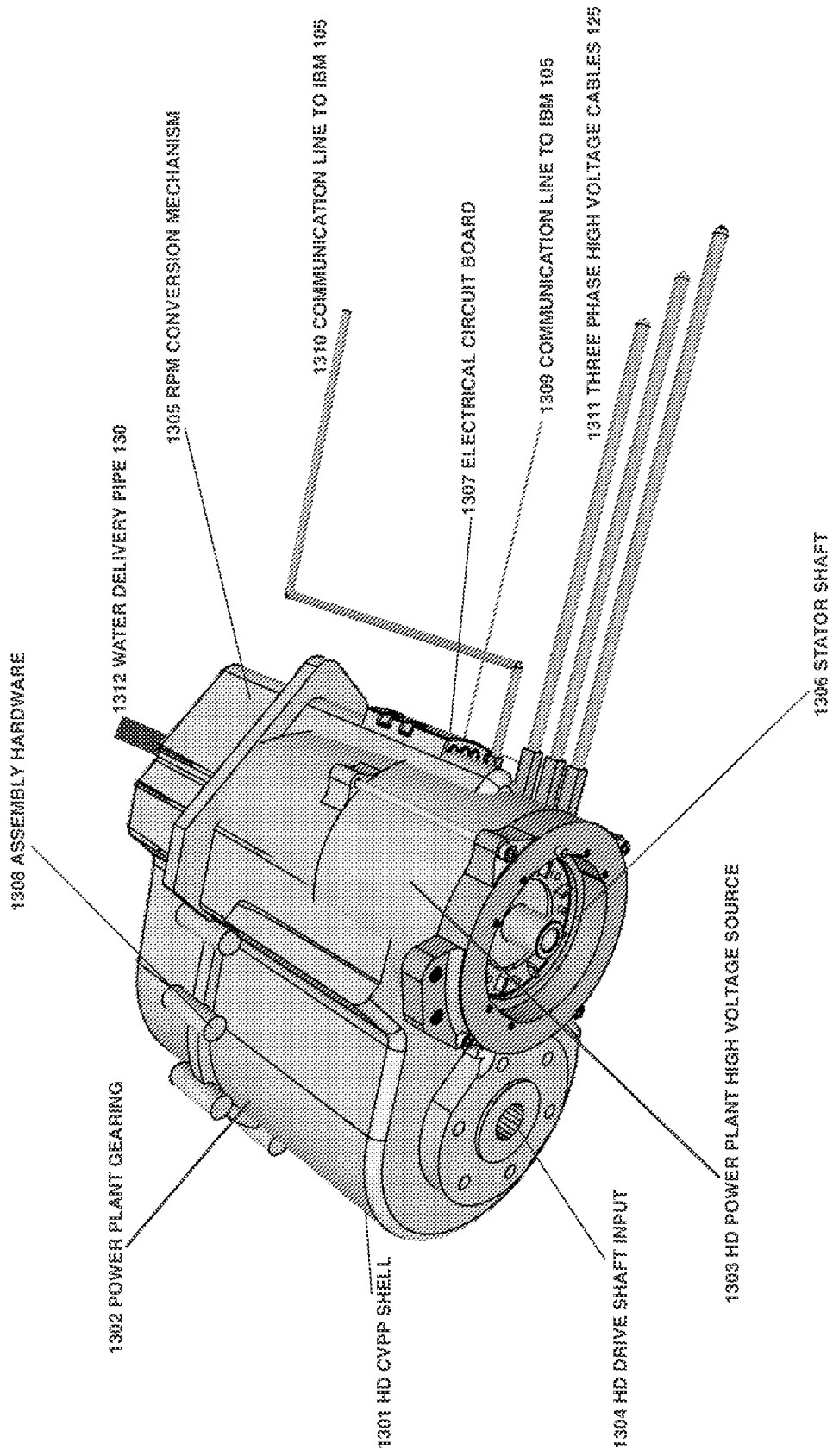
FIG. 13 HEAVY DUTY CONTINUOUS VARIABLE POWER PLANT (HD-CVPP)

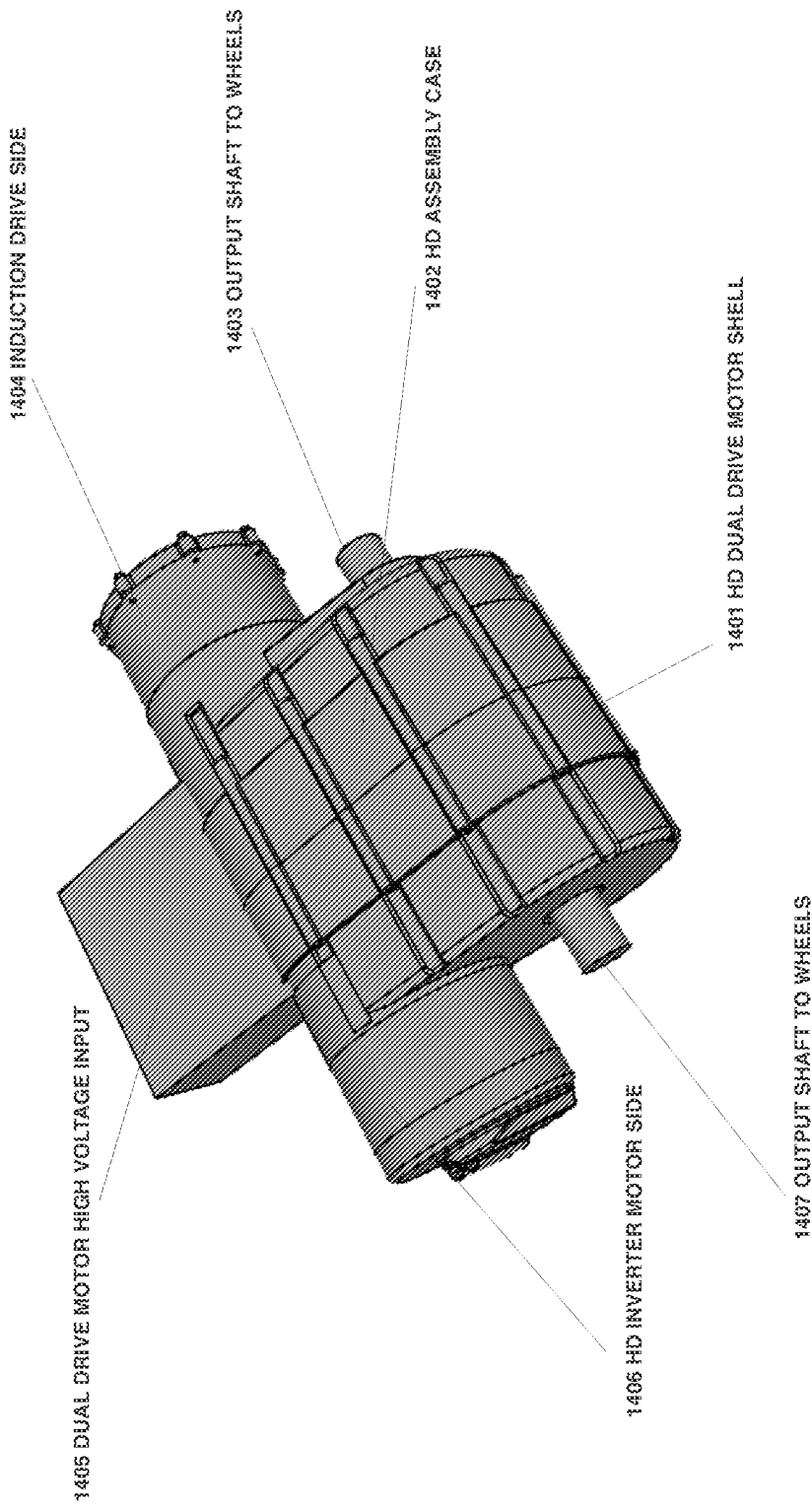
FIG. 14 HD DUAL DRIVE ELECTRIC MOTOR FOR DRIVE AXLE ONE

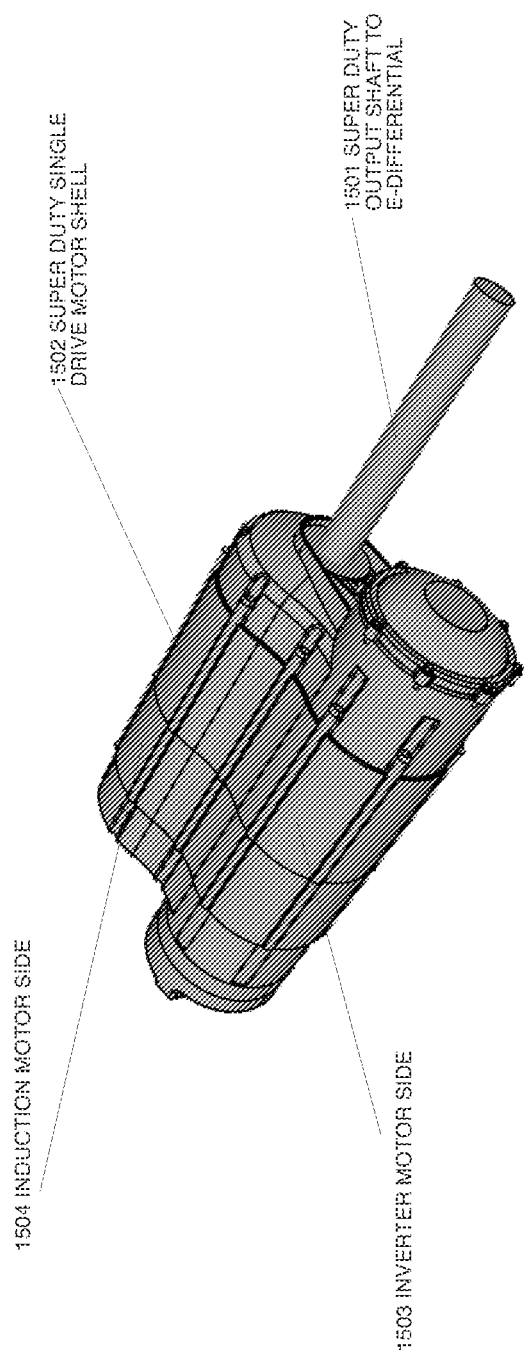
FIG. 15 SUPER DUTY SINGLE DRIVE MOTOR

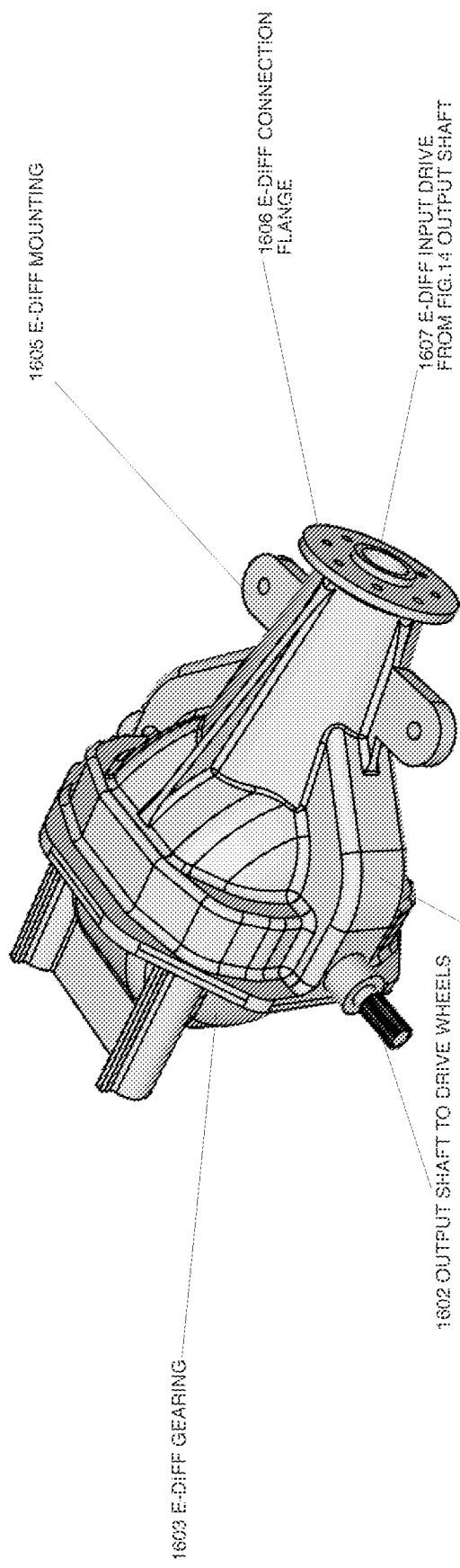
FIG. 16 ELECTRONIC DIFFERENTIAL (E-DIFF)

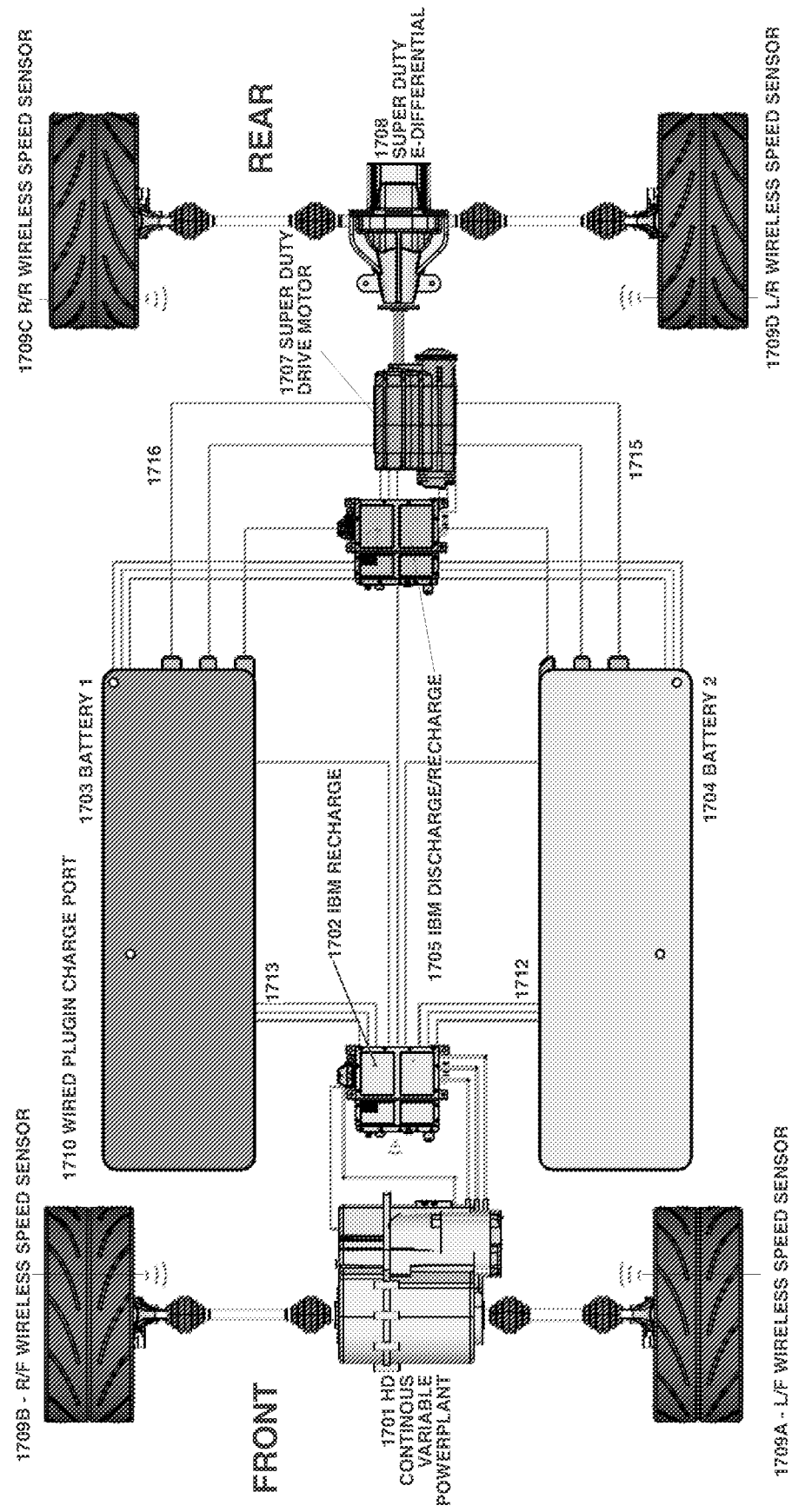
FIG. 17 URD LIGHT DUTY APPLICATION

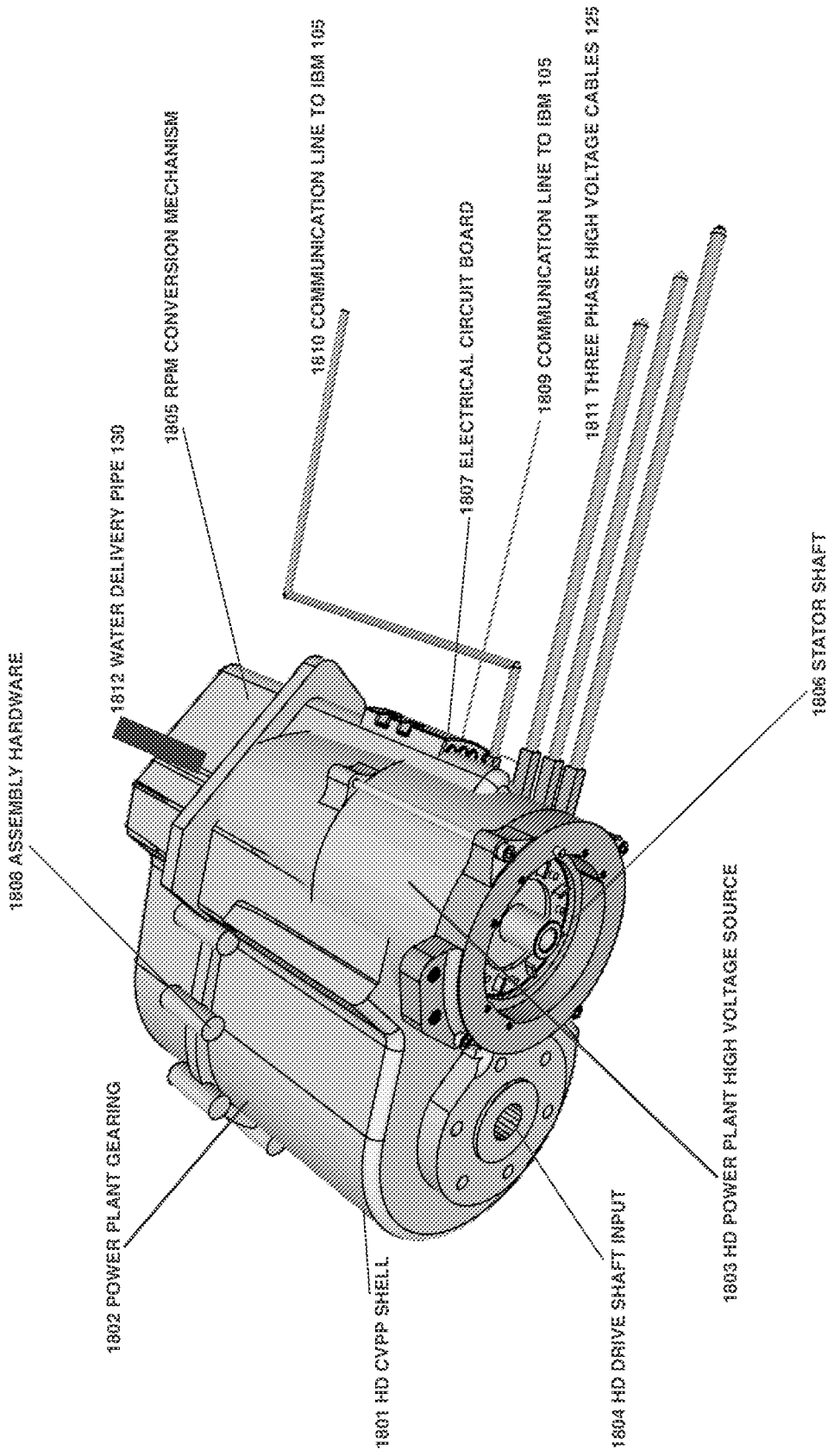
FIG. 18 RACE PERFORMANCE CONTINUOUS VARIABLE POWER PLANT (RP-CVPP)

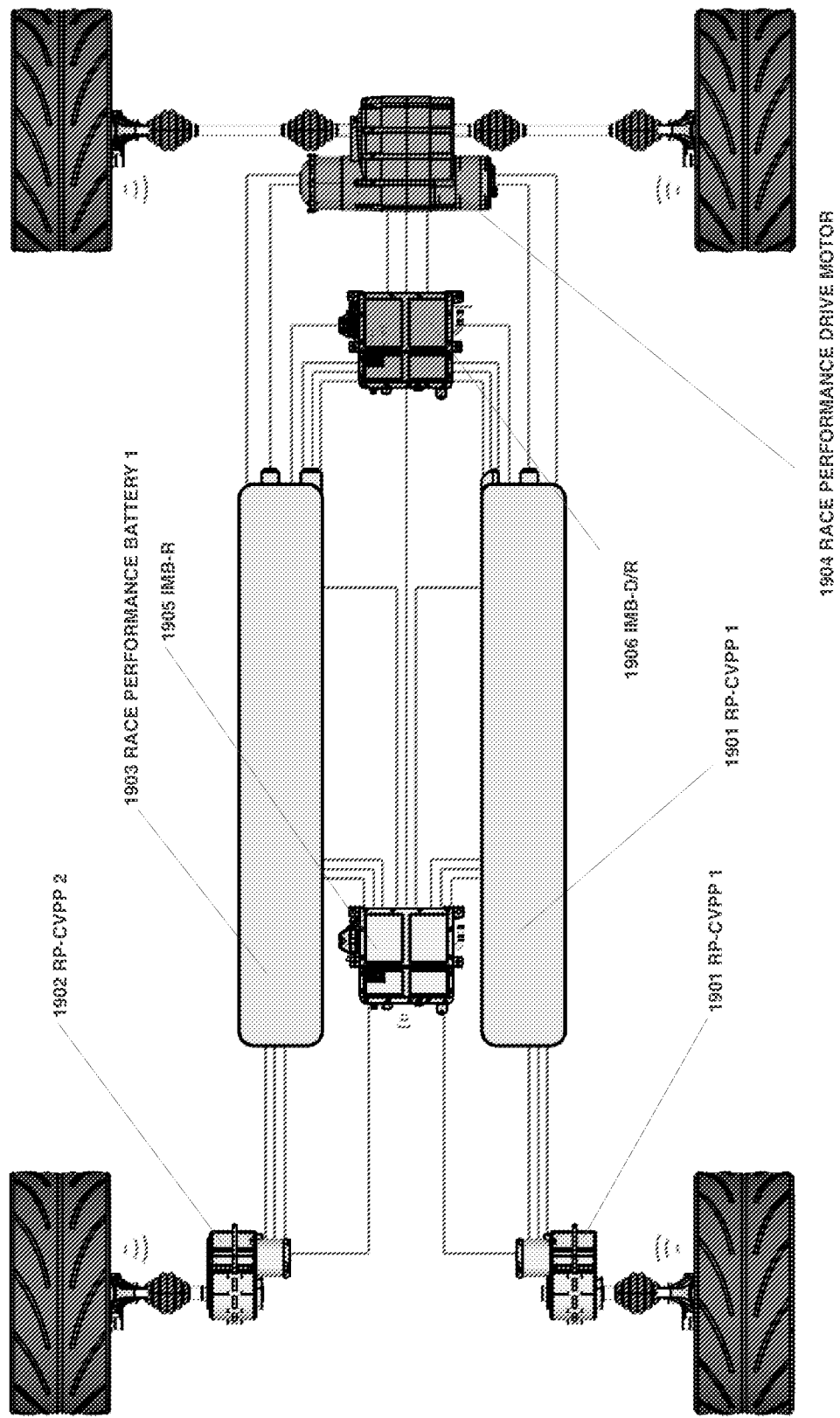
FIG. 19 RACE PERFORMANCE CONTINUOUS VARIABLE POWER PLANT LAYOUT (RP-CVPP)

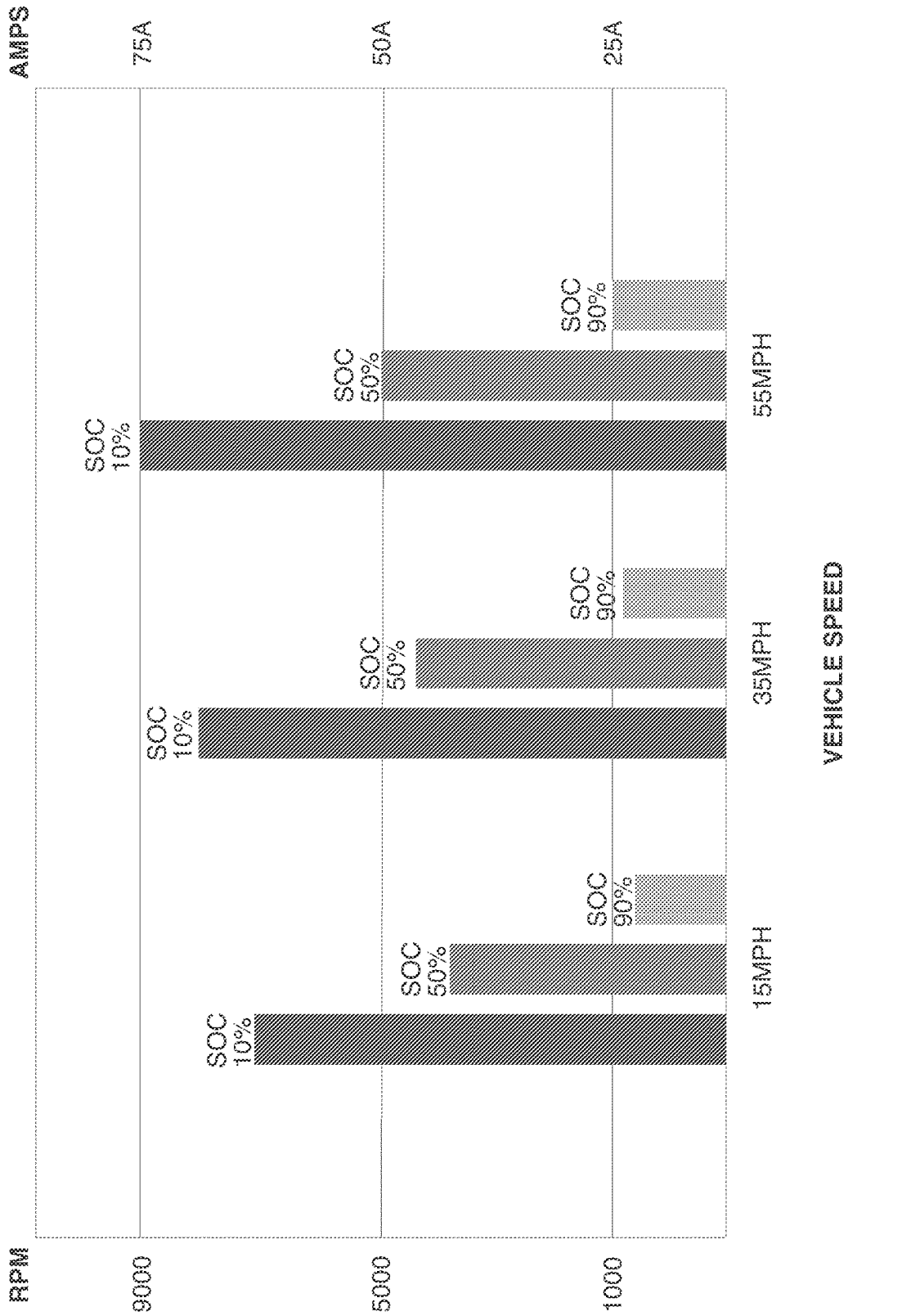
FIG. 20 BAR CHART CALCULATOR FOR CVPP RPM, VEHICLE SPEED, CVPP AMPS OUTPUT

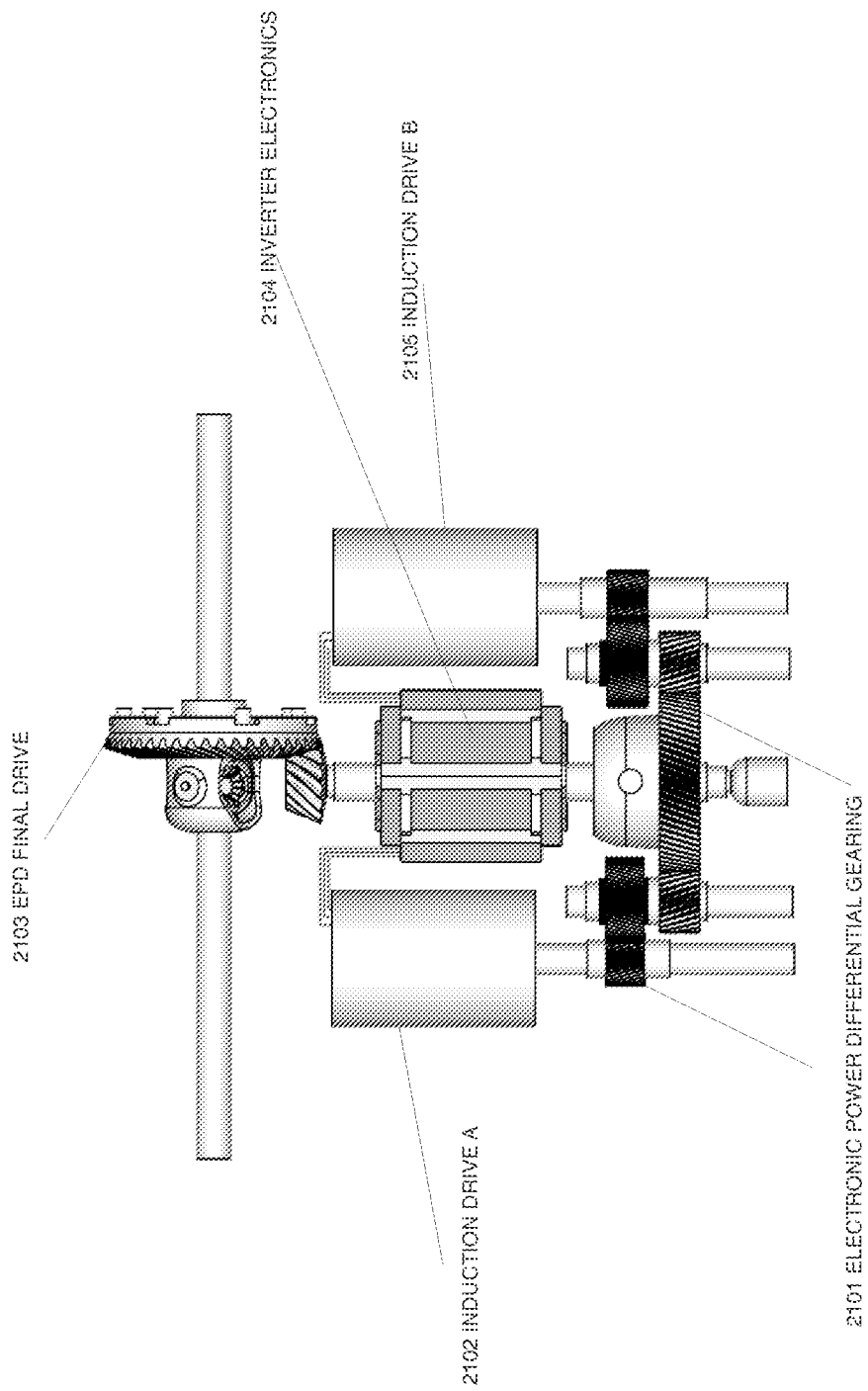
FIG. 21 ELECTRONIC POWER DIFFERENTIAL INTERNAL LAYOUT (EPD)

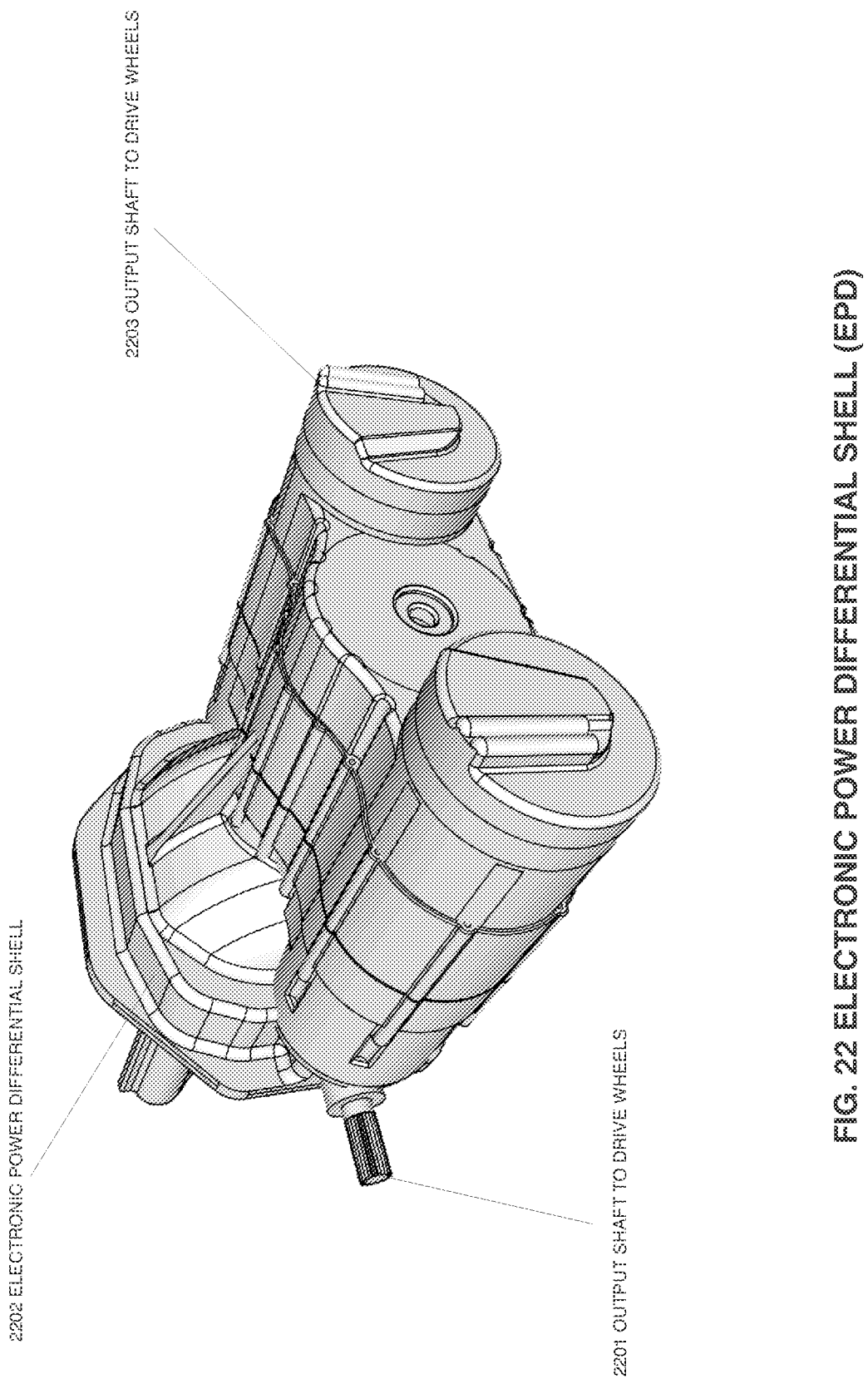
FIG. 22 ELECTRONIC POWER DIFFERENTIAL SHELL (EPD)

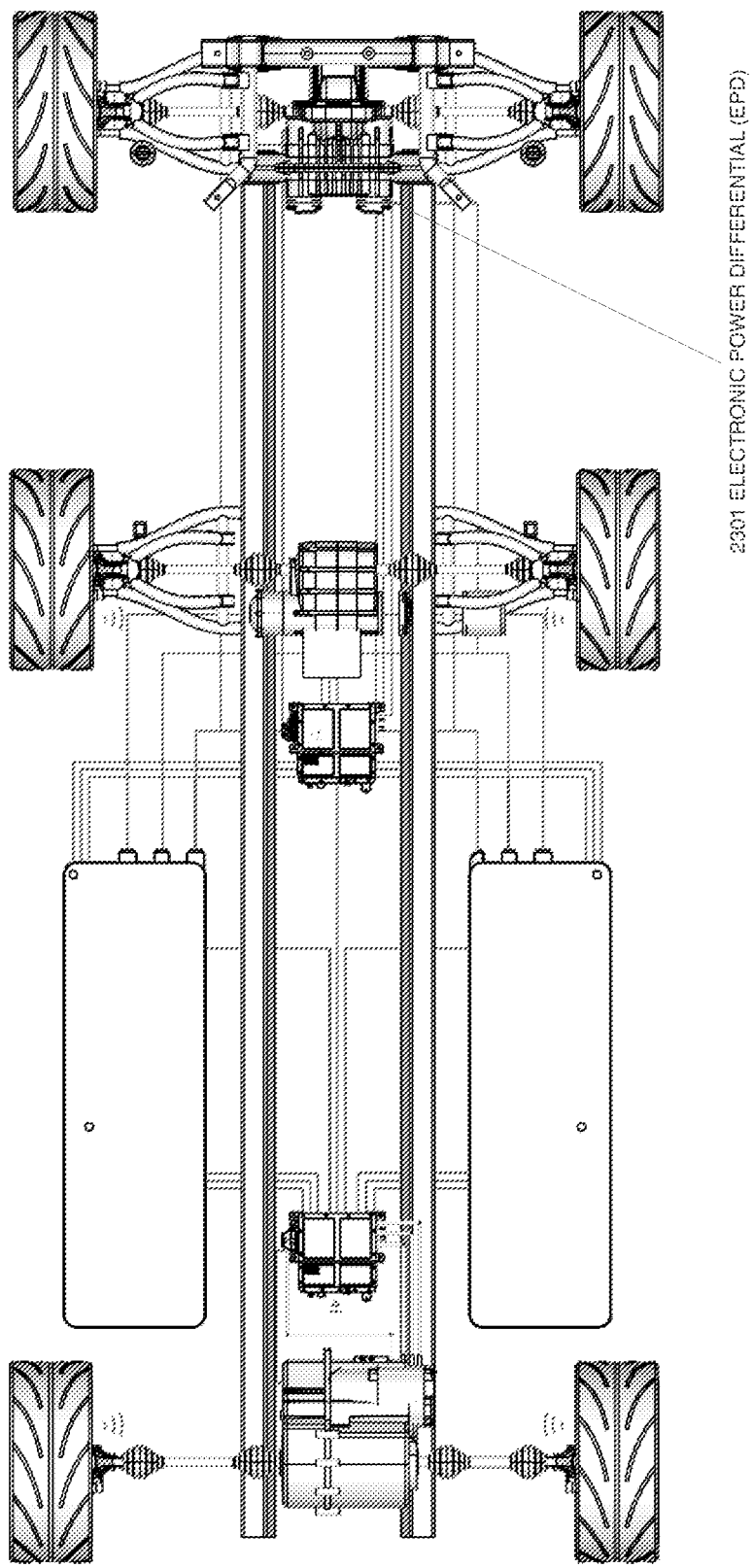
FIG. 23 HEAVY DUTY APPLICATION ELECTRONIC POWER DIFFERENTIAL LAYOUT (HD-URD)

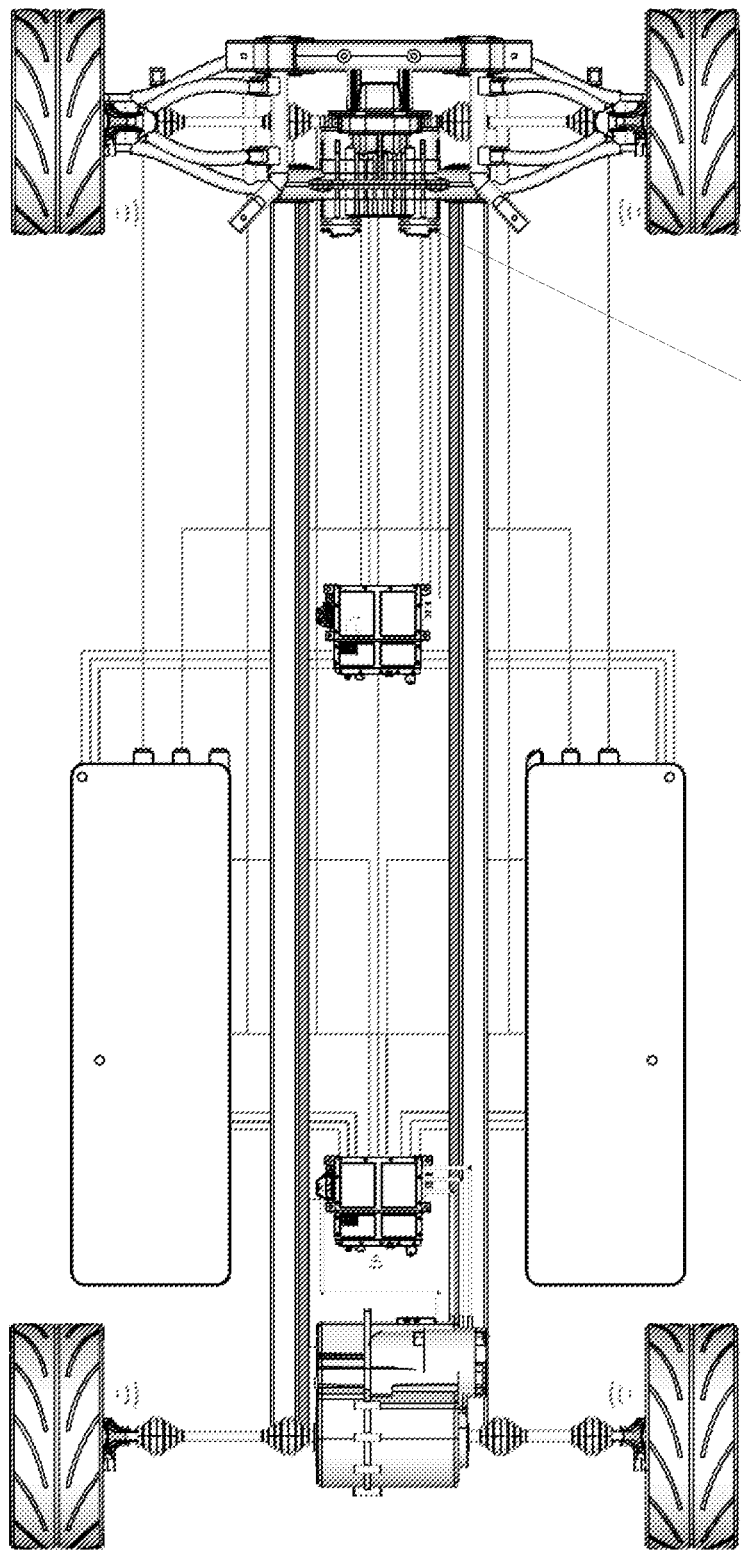
FIG. 24 URD LIGHT DUTY APPLICATION ELECTRONIC POWER DIFFERENTIAL LAYOUT (HD-URD)

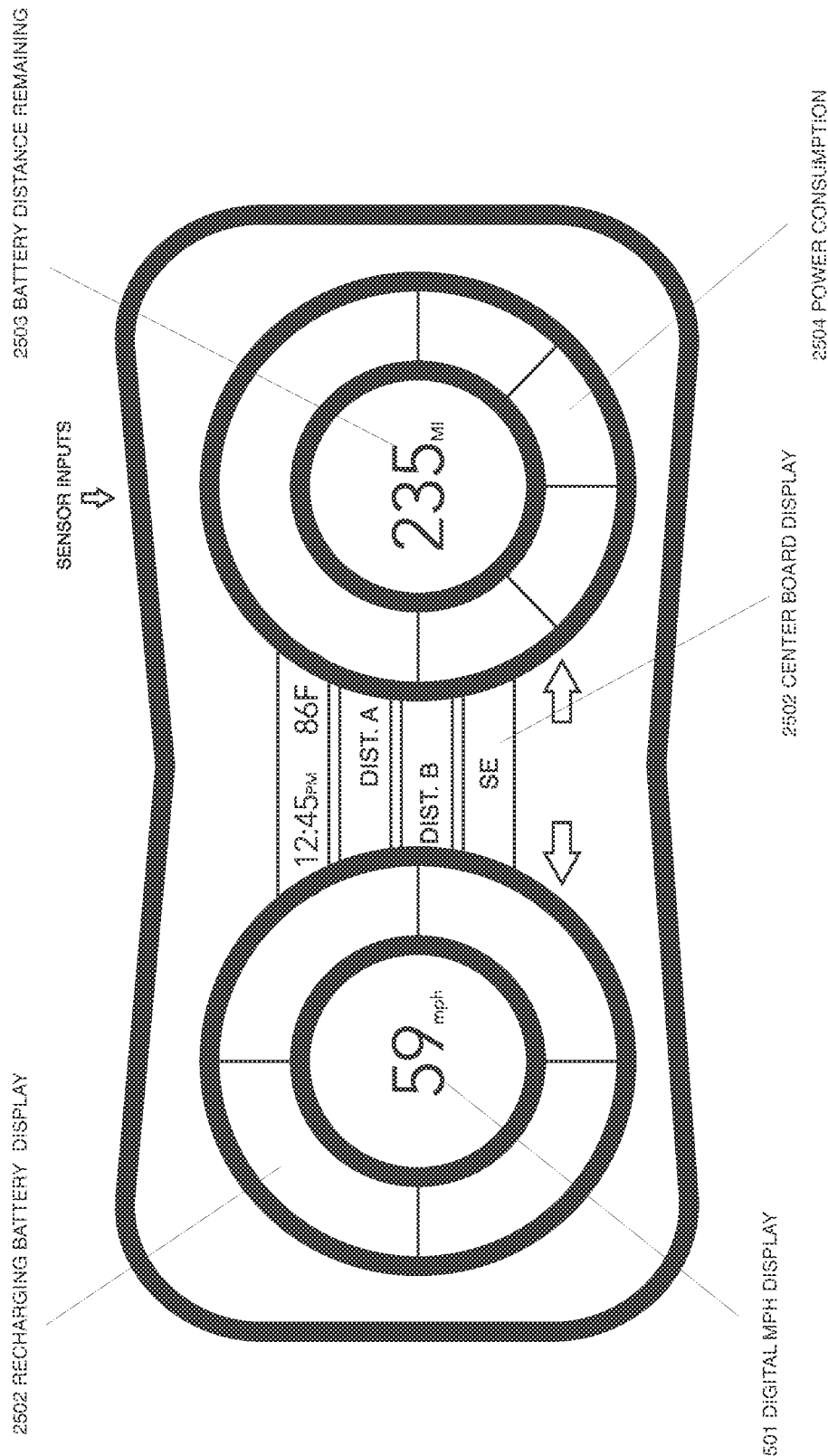
FIG. 25 DIGITAL DASHBOARD

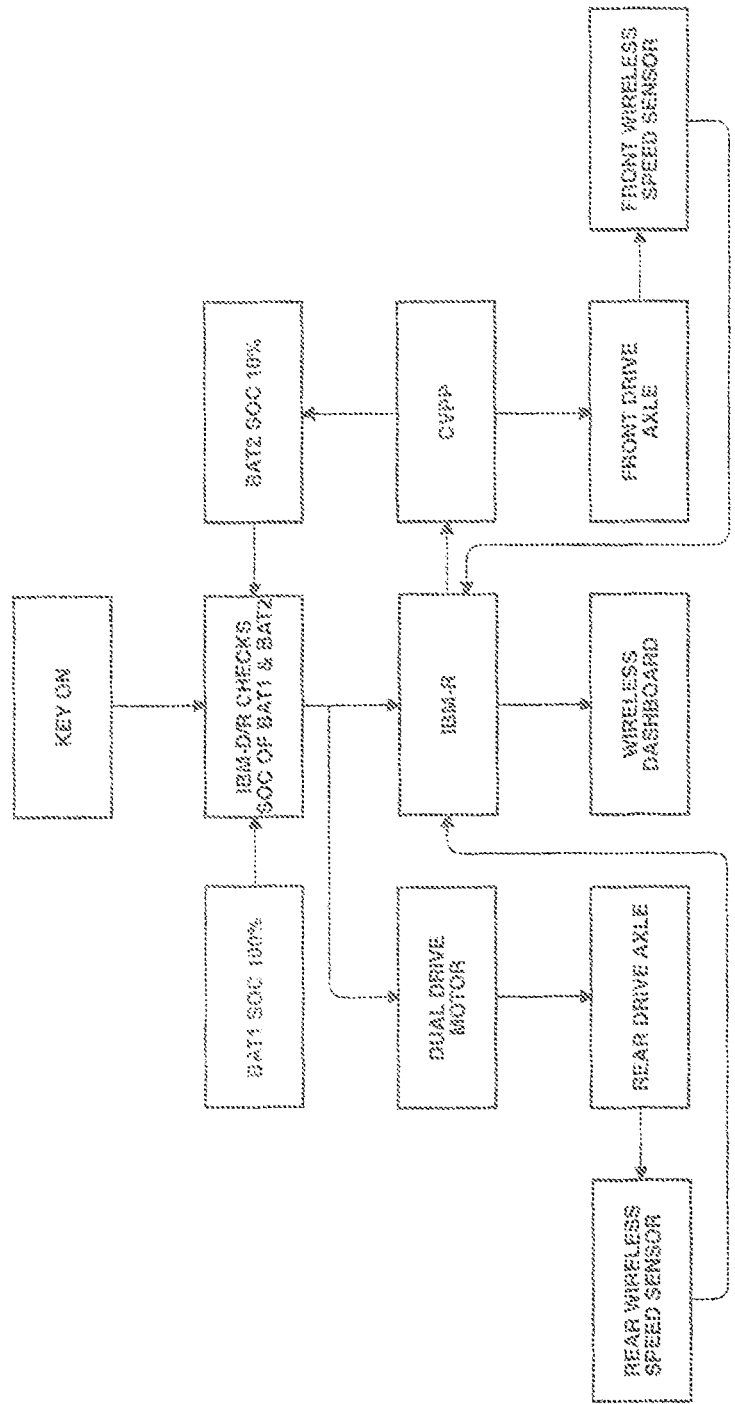
FIG. 26 URD OPERATIONAL FLOWCHART

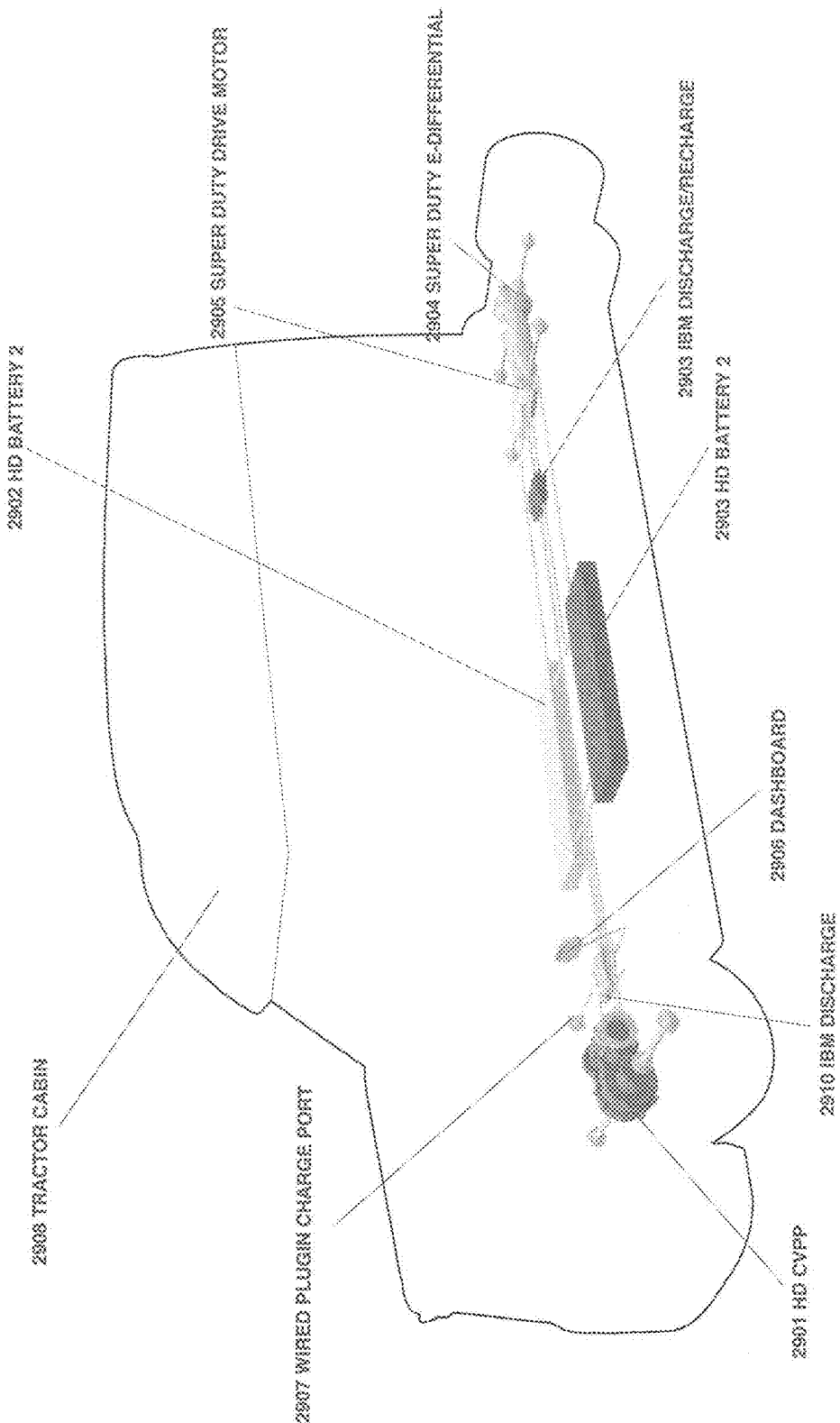
FIG. 27 TRACTOR UNIT DRIVER

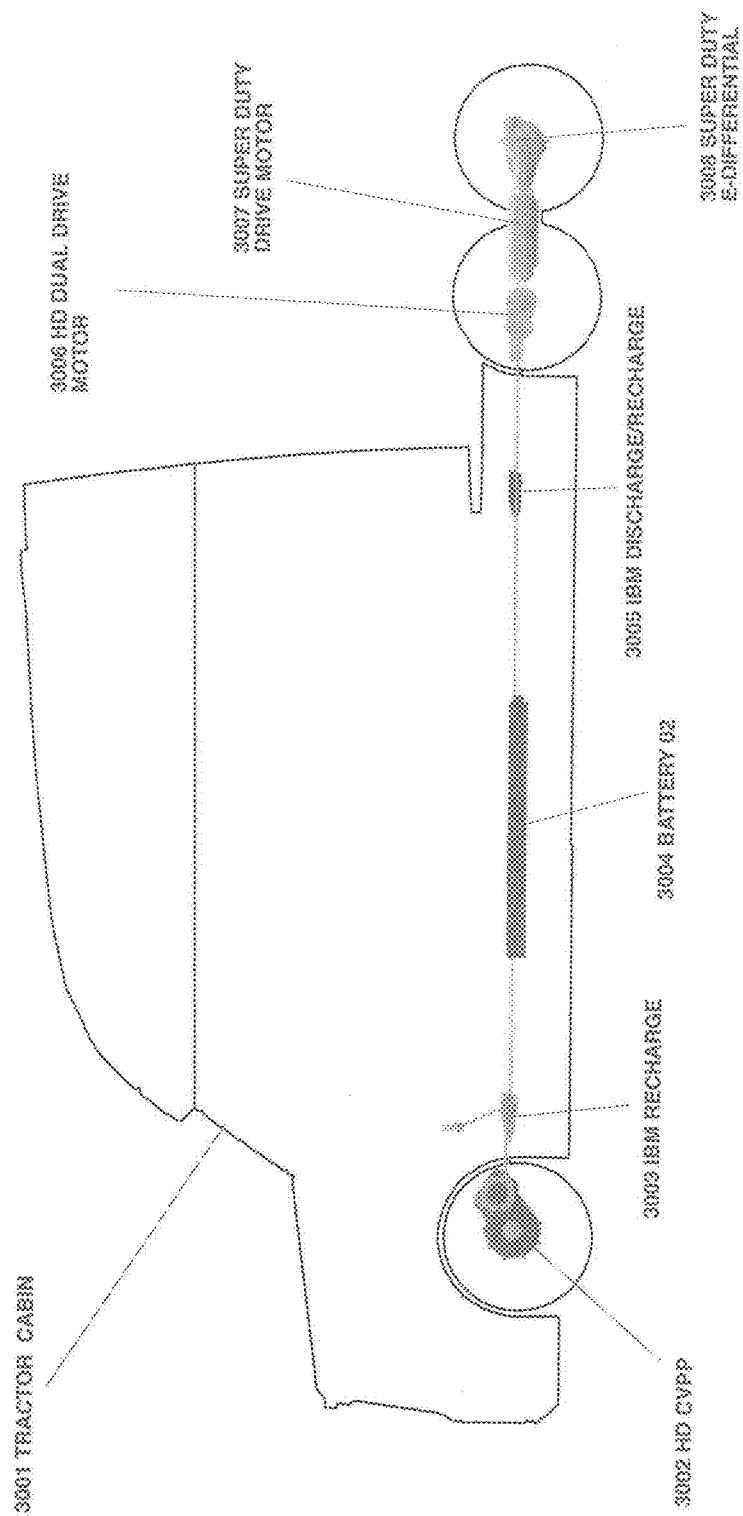
FIG. 28 CABIN OF THE TRACTOR UNIT

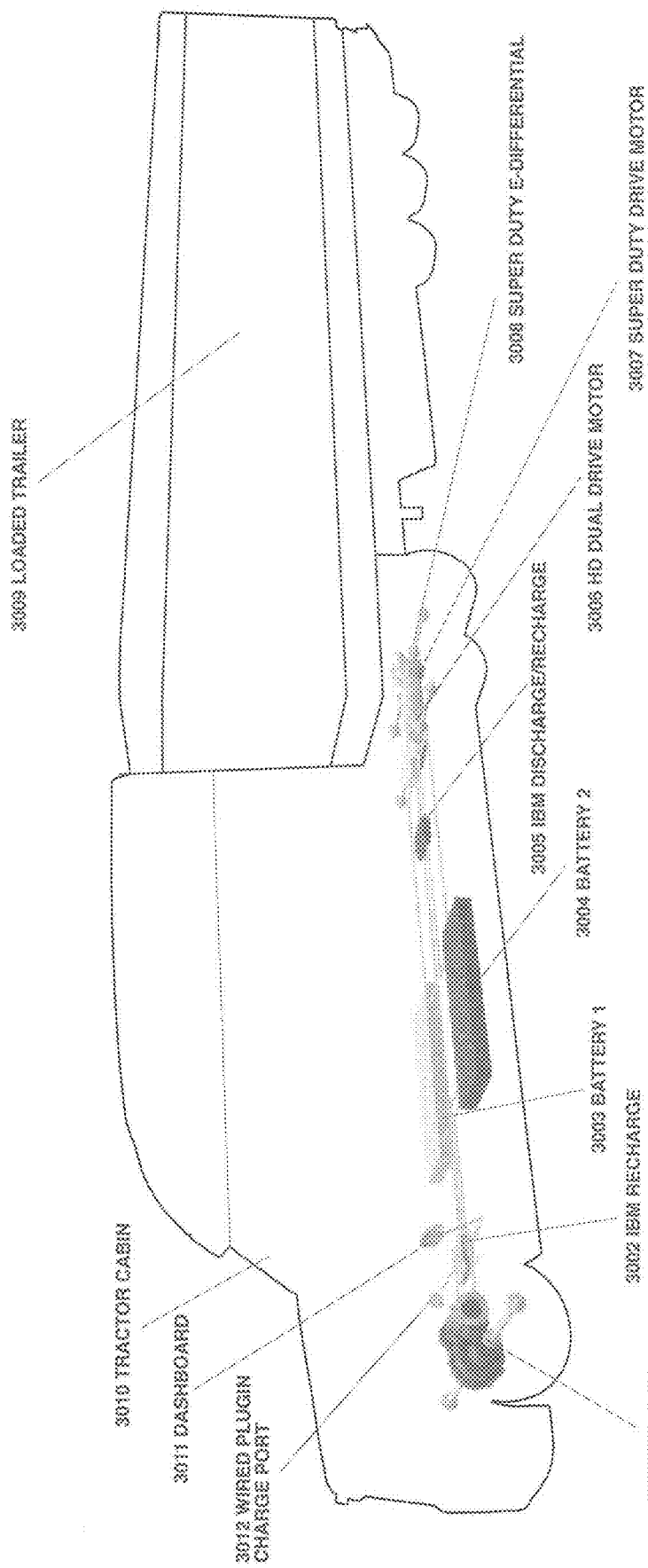
FIG. 29 LOADED TRACTOR TRAILER

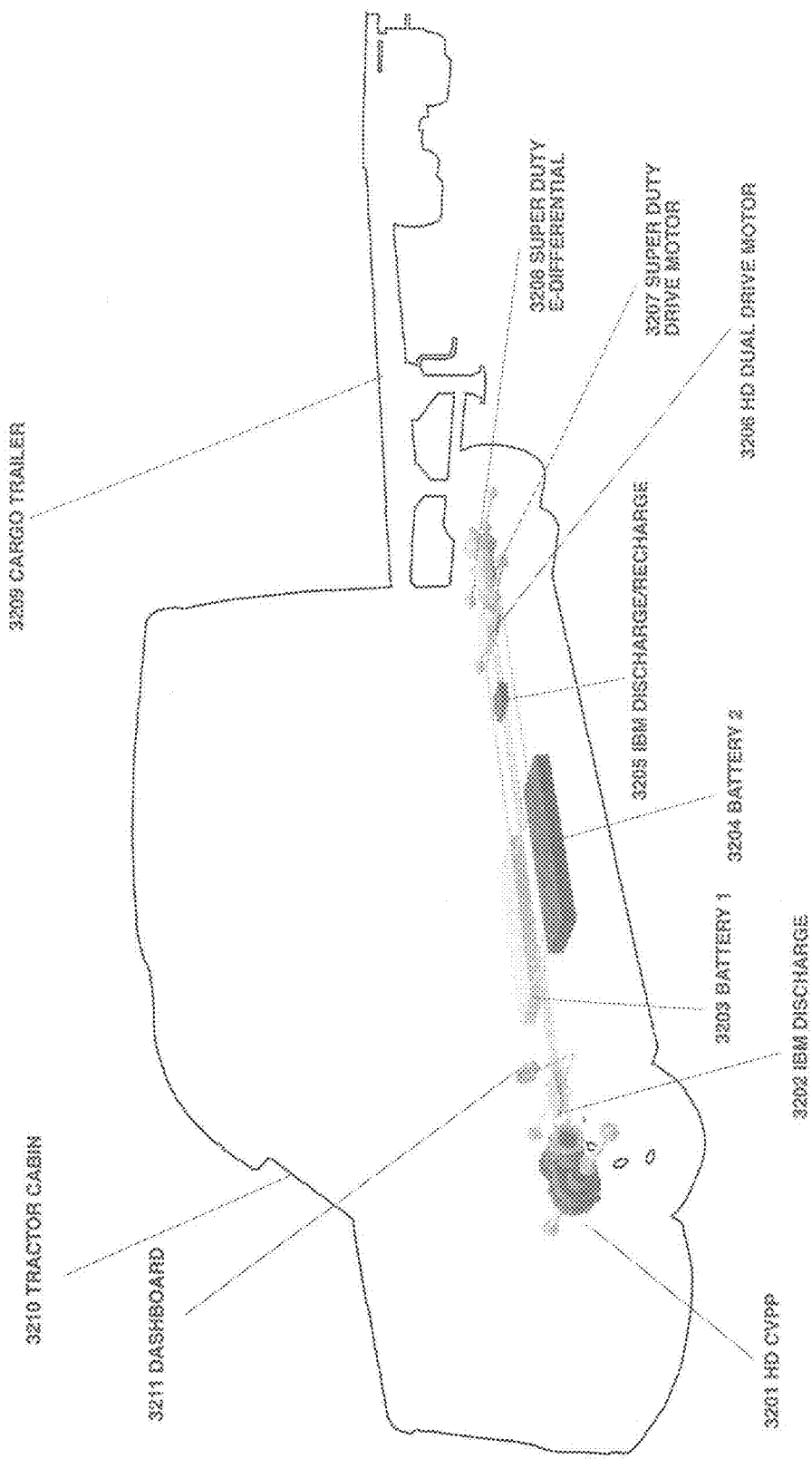
FIG. 30 TRACTOR TRAILER

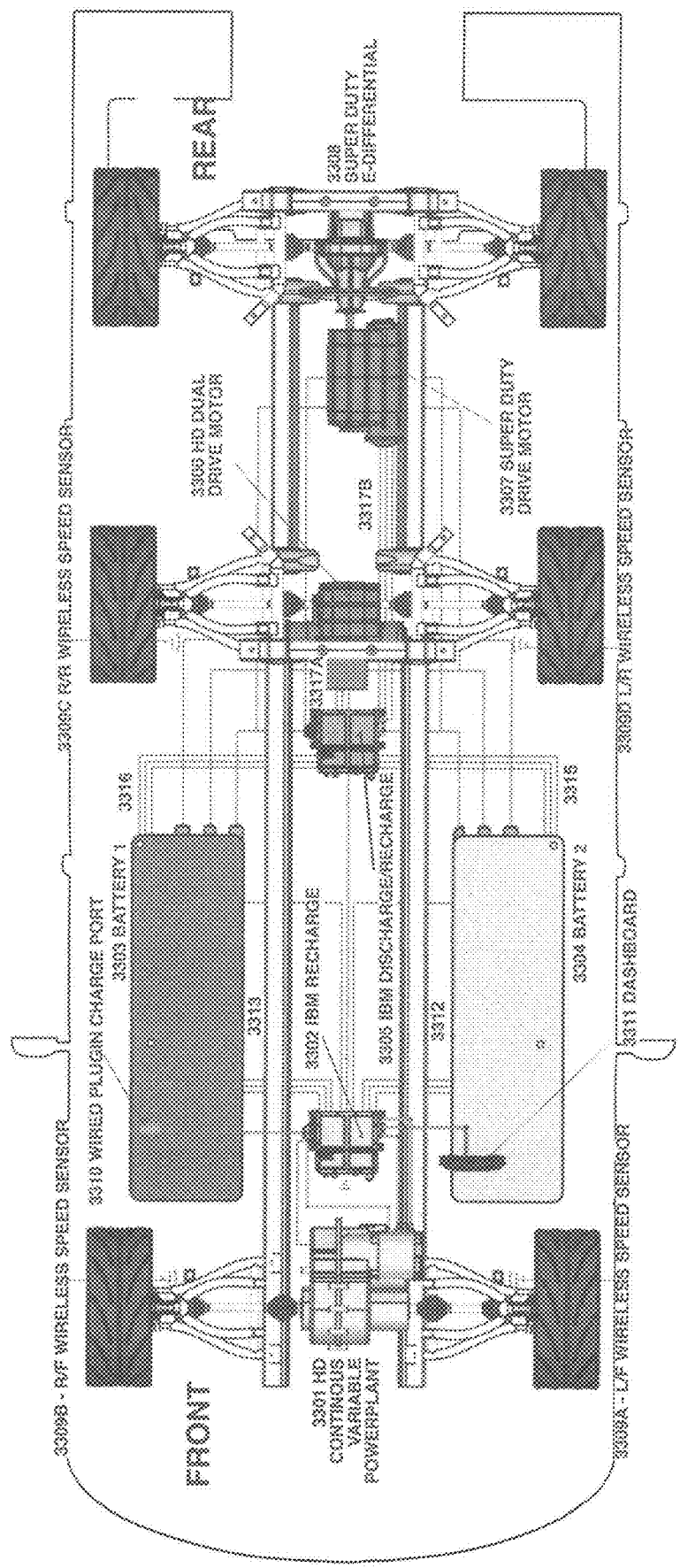
FIG. 31 HEAVY DUTY APPLICATION HIGH VOLTAGE LAYOUT (HD-URD) TRACTOR UNIT DRIVER

DUAL DRIVE ELECTRIC VEHICLE WITH UNLIMITED RANGE DRIVE CAPABILITIES

CROSS REFERENCES TO RELATED APPLICATIONS

This application is a continuation of U.S. patent application Ser. No. 17/302,454, filed on May 3, 2021, entitled "Dual Drive Electric Vehicle with Unlimited Range Drive capabilities", which claims the benefit of U.S. Provisional application No. 62/703,304, filed on May 4, 2020, all which applications are hereby incorporated herein by references.

TECHNICAL FIELD

Our Dual Drive Electric Vehicle with Unlimited Range Drive capabilities (URD) system invention improves distance of travel of an automotive electrical vehicle without the need of stopping to recharge high voltage batteries while providing a futuristic unlimited driving experience. Furthermore, our URD system invention eliminates battery charging waiting time of 30-60 minutes every 200 to 300 miles drive range and can achieve unlimited range of miles with a single battery charge under proper conditions. Wherein unlimited range miles drive depends on battery types and battery state of charge, and may achieve one or more than one million miles drive, equating as unlimited (or extended) miles drive depending on physical life of a battery which may be 10 to 15 years. Further, our URD system has a high voltage wireless charging port available through magnetic fields charge in addition to a high voltage wired charging port. High voltage Wireless charging port makes life easy and convenient to charge an electrical vehicle at home.

BACKGROUND

Current automotive electric vehicles have limited travel distance on a single charge resulting from the design of charge & go technology, where electrical vehicle drains the battery by the consumption of the driving motors. Typically, an average of 200 to 300 miles range on a single charge is achieved. Then the driver will have to stop and charge high voltage batteries. Currently electrical vehicle systems have a high voltage wired plug to charge batteries. Typical current charge period is about 30-60 minutes, and the customer must pay for faster inductive charge rates.

Our URD system eliminates charging waiting period and provides unlimited miles drive rang. Also, sf our URD system provides a high voltage wireless charging port that makes life easy and convenient to charge an electrical vehicle at home.

PRECONDITIONS and SUMMARY

It is normal practice for battery manufacturers to supply batteries with at least 50% of charge. Initially these batteries are installed in the modeled vehicle as is. The system describing Unlimited Range Drive (URD) capabilities of electric vehicles using machine learning techniques, assisted by intelligent battery modules (IBM-R) and (IBM-D/R), high voltage heavy duty continuous variable power plant (HD-CVPP), and introducing newly designed Electronic Power Differential (EPD). Intelligent battery and power plant modules work in harmony and continuously provide feedback to each other. This causes a battery to recharge while the other is in use to drive, the intelligent battery module discharge/recharge (IBM-D/R) works in harmony with the electronic power differential to supply supplemental drive power. This charging, recharging process and dynamically switching battery in use is continued until physical life of the batteries is exhausted approximately 10 to 15 years. This platform can be implemented in several chassis such as economy, medium, large, and extra-large size vehicles; larger chassis including, but not limited to light duty trucks and vans up to heavy duty cargo tractor trailer and commercial public transportation buses.

Looking forward, with the adaptability of our URD platform, all URD applications can be made available to replace existing internal combustion engines and drivetrains which can be retrofitted to our URD platform, and accessible to the aftermarket community. Consequently, creating the opportunity for more cost-effective manufacturing and for continual education for skilled laborers and electric vehicle technicians for the inevitable shift to fully electric and autonomous vehicles.

Overview of the URD System

With our URD system we can reach unlimited miles on a single charge, by alternating the use of both batteries individually when driving long distance. Our concept will consist of two individual, electric vehicle high voltage battery (HV) set up, working independently to extend travel. It will consist of one drive motor, one (CVPP) with dedicated generator, two lithium battery units or newly designed solid-state batteries to save weight and space. Batteries with possible range capabilities of 300+ miles each working together can achieve unlimited range by alternating battery assembly 103 and 104 when driving in URD mode. Unlimited range depends on battery type, physical and environmental condition of batteries and battery shelf-life, which can be from 10 years to 15 years or more. A continuation of the operational flow describing the URD operation is detailed in FIG. 26.

Further, our URD system unique design uses high voltage continuous variable power plant (CVPP) technology driven by Axle shaft rotation energy to drive generator to generate high voltage current, meeting the high voltage recharging requirements, as compared to an internal combustion engine driven generator commonly used. In an expansive view, URD differs and excels from today's electrical vehicles (EV) market in the following ways:

- Smaller dual HV battery setup an
- industry first, CVPP
- With the combination of the CVPP, IBMR, IBM-D/R working concurrently and dynamically monitoring and controlling the URD system logic.
- Robust design that can be seamlessly implemented to 18-wheeler, tractor trailer units, to high performing EV race cars.

BRIEF DESCRIPTION OF FIGURES

FIG. 1. Shows overview of URD high voltage layout.

FIG. 2. Shows low voltage conversion layout including wireless communication for speed sensors.

FIG. 3. Details continuous variable transmission side of FIG. 9 continuous variable power plant (CVPP).

FIG. 4. Details the three-phase high voltage generator side of FIG. CVPP

FIG. 5. Shows overview of the intelligent battery module-recharge unit (IBM-R) controlling and commanding high voltage energy from FIG. 9 CVPP and high voltage batteries.

FIG. 6. Shows overview of the intelligent battery module-recharge/discharge unit (IBMR/D) receiving commands from IBMR in FIG. 5 and commands electric dual drive motor in FIG. 7.

FIG. 7. Details the electric dual drive motor responsible for receiving the three-phase high voltage energy from IBMR/D in FIG. 6 and converting it into rotational movement, driving the rear wheels.

FIG. 8. Shows high voltage (HV) battery one and HV battery two in either lithium ion or solid-state battery FIG. 9. Details the assembly and design of the CVPP unit in which is internally comprised of the CVT from FIG. 3 and the HV generator from FIG. 4

FIG. 10. Shows overview of original schematic of Unlimited Range Drive prior to the development of FIG. 9, CVPP.

FIG. 11. Details basic component layout of the creative URD system under full rear wheel drive mode powered by a fully charged HV battery while the front axle is recharging the drained HV battery.

FIG. 12. Details the full heavy-duty layout of HD-URD with a high capacity front CVPP originally detailed in FIG. 9.

FIG. 13. Shows the design of the HD-CVPP unit utilized in FIG. 12 HD-URD.

FIG. 14. Shows drive axle one of the HD-URD overview from FIG. 12 fitted with (HD) dual drive electric motor.

FIG. 15. Details the super duty, single drive electric motor from FIG. 12 that delivers power to FIG. 16 (E-differential).

FIG. 16 shows E-differential which converts the three-phase electrical current output from super duty output shaft from FIG. 15 and delivers this power to drive axle two also stated in FIG. 12.

FIG. 17. Shows URD layout with CVPP functionality employed to light duty application.

FIG. 18. Shows URD layout with CVPP functionality employed to race performance applications.

FIG. 19. Shows URD layout with RP-CVPP functionality employed to race Performance.

FIG. 20. Shows URD various speeds/various state of charge calculation table.

FIG. 21. Shows internal construction of electronic power differentials gearing, inverter and induction drives.

FIG. 22. Shows power differential shell construction.

FIG. 23. Shows heavy duty URD layout with electric power differential.

FIG. 24. Shows light duty URD layout with electronic power differential.

FIG. 25. Shows digital Dashboard display with all vehicle inputs, battery status, battery SOC and remaining distance to charge.

FIG. 26. Shows description flowchart of URD operation from key on.

FIG. 27. Shows Tractor unit driver with HD-CVPP as an example of an HD application previously presented in the FIG. 12.

FIG. 28. Shows Tractor unit driver with a cabin as an example of an HD application.

FIG. 29. Shows Tractor unit with a loaded trailer as an example of an HD application.

FIG. 30. Shows Tractor unit with a cargo trailer as an example of an HD application.

FIG. 31. Shows Tractor unit driver high voltage layout as an example of an HD application previously presented in the FIG. 12.

FIG. 21 through 31 describes invention elements in easy-to-understand manner with examples which are already described in the previous FIGS. 1-20.

DETAILED DESCRIPTION OF URD SYSTEM

Embodiment 1

FIG. 1 describes overall URD system concept (embodiment 1). In FIG. 1 Dual Drive motor will achieve its standard capable range of 300 or more miles by consuming its fully charged battery assembly 103, the battery assembly 104 is being charged or maintained until battery 103 reaches its lowest state of charge. With around 10% battery charge remaining our URD system Intelligent Battery Module Recharge (IBM-R) 105 will automatically seamlessly engage battery 104 to continue driving the vehicle as charging process for the next 300 miles, with about 3 hours of continuous charging at ranges of driving between 35 to 65 miles an hour. This battery charging and discharging process will repeat itself until the physical life of the batteries depletes, making our invention an unlimited range drive (URD) system.

At local speeds below 35 mph (1 to 35 mph) the front installed Continuous Variable Transmission (CVT) 107 will adjust recharge rate of the Generator 106 by adjusting its gear ratios and allowing higher charging rates at lower speeds. One such example being, when vehicle speed is at 10 mph the gear ratios will set to continue re-generating the energy at higher RPM through the generator, this way CVT 107 continuously adjust higher charging to lower vehicle speeds, at higher vehicle speeds the CVT 107 will adjust its gear ratio to provide lower RPM to the generator.

Depending on the batteries state of charge, the IBM-R 105 will determine the needed output of the generator 106 and control the ratio through the CVT assembly 107. The batteries charging and discharging information is transmitted to the dashboard 114 through Bluetooth communication module 121.

Further, individual components in FIG. 1 are described below with their functionality:

High Voltage Battery 1 (BAT 1)

High voltage battery 103 with operating capabilities of 240 to 680 volts, Comprising Lithium ion or solid-state DC batteries, constructed with military grade carbon fiber construction, for structural rigidity and weight saving. The high voltage battery is made up of 20 cell packs with 4 individual cells per pack. The specification will be at a nominal voltage of 3.2 volts per individual cell. Further internal components of the HV battery are comprised of temperature and humidity sensors and voltage and current (amperage) sensors; coolant input and output delivery pipes and a main HV battery service disconnect plug for safe battery servicing. Battery cell pack configurations can vary based on manufacture designs and high voltage requirements.

Please note that battery, battery assembly or battery pack wording use interchange in figures and/or descriptions.

High Voltage Battery 2 (BAT 2)

High voltage battery 104 with operating capabilities of 240 to 680 volts, Comprising Lithium ion or solid state direct current batteries, constructed with military grade carbon fiber construction, for structural rigidity and weight saving. High voltage battery is made up of 20 cell pack with 4 individual cells per pack. With specification of a nominal voltage of 3.2 volts per individual cell. Further internal components of the HV battery are comprised of temperature and humidity sensors and voltage and current sensors;

coolant input and output delivery pipes and a main HV battery service disconnect plug for safe battery servicing. Batteries cell packs configuration can vary based on manufacture designs and highest voltage needed.

Bluetooth Wheel Speed Sensor (A-D)

Bluetooth wheel speed sensor 109a,109b,109c,109d monitors the rotational speed of the assigned wheel, providing crucial information to the Bluetooth Receiver 121, then communicating this information to the intelligent battery module recharge (IBM-R) 105 to adjust the ratio output of the CVT assembly 107, that will affect the generating output of the high voltage generator 106. Wheel speed information is transmitted via Bluetooth communication 121 to the dashboard 114.

Various Speeds/Various State of Charge Output

For speeds of 55 mph and above up to legal speed and batteries at 90% state of charge, generator 106 needed output will be at its lowest capabilities of about 5-25 amps, as the generator stator shaft speed will be between 500-900 RPM of the stator inside generator (GEN) 106, mated to the output shaft of the CVT 107. CVT drive 107 needed outputs will be at its lowest gear ratio changing generator idling between 500-900 RPM of the stator inside generator 106, mated to the output shaft of the CVT 107.

For speeds of 15 mph and batteries at 10% state of charge, generator 106 needed output will be at its highest capabilities of about 75-125 amps as the generator stator shaft speed will be between 5000-9000 RPM of the stator inside generator 106, mated to the output shaft of the CVT 107. CVT drive 107 needed outputs will be at its highest gear ratio changing generator idling between 5000-9000 RPM of the stator inside generator 106, mated to the output shaft of the CVT 107.

IBM-R 105 will always monitor charging rate of batteries 103 and 104, under all speeds and automatically determines to charge or not to charge batteries. FIG. 20 shows relations and calculations of vehicle speeds, state of charge and RP output of the CVT and HV GEN assembly.

Intelligent Battery Module Recharge (IBM-R)

Intelligent battery module recharge 105 is responsible for monitoring the output of the generator 106, and responsible for commanding and controlling the CVT 107 output ratio to determine the appropriate needed charge rate from the generator 106. Communicating with Intelligent battery module discharge/recharge 102. It also monitors the usage of wireless charging port 108 supplied with vehicle to use at home for magnetized charging application to charge the batteries. It also monitors and controls the physical connection of wired plugin adaptor 110 charge port use to charge batteries at travelling charging stations and monitors the state of charge of the batteries 103 and 104. In addition, intelligent battery module recharge 105 receives wheel speed data from Bluetooth wheel speed sensors 109a, 109b, 109c and 109d. Also, IBM-R 105 transmit battery status and speed information to the dashboard 114 via Bluetooth.

DC Three Cable Wiring

Three cable wiring 112/113 is the physical connection between high voltage batteries 103 and 104 to the intelligent battery module recharge (IBM-R) 105. This delivers the needed high voltage current from intelligent battery module (IBM-R) 105 being supplied from generator 106. Furthermore when 105 determines that battery 103 is fully charge then it supplies charging to battery 104 and vice versa.

Dashboard

Dashboard 114 is a wireless mobile component that feeds infotainment information through a large detachable touch screen, some examples are vehicle speed, parameters and battery state of charge, batteries temperature, batteries humidity and nominal voltage obtained from IBM-R 105, also obtaining information from other sensors such as climate control, temperature, interior lightings, settings, radio sources, controls menus for options, Bluetooth compatibilities with the use of mobile phones and devices such as tablets. Also being able to mirror from current mobile devices. Detailed description of digital dashboard is shown in FIG. 25.

Intelligent Battery Module Discharge/Recharge (IBM-D/R)

The IBM-D/R 102 is also responsible for monitoring the State of Charge (SOC) of both batteries 103 and 104. Is also responsible for communications to IBM-R 105 to provide batteries (SOC). Automatically selects which battery 103 or 104 is best suited for use with dual drive motor 101, depending on the batteries state of charge. Commands and monitors the output of the dual drive motor 101 and controls its off-throttle energy recovery capabilities of the dual electric motor 101. Also monitors the wireless wheel speed data from the Bluetooth wheel speed sensor 109c and wireless Bluetooth wheel speed sensor 109d, to determine which rear wheel needs more electric input left or right based on traction and depending on weather conditions, surrounding environment and road conditions.

AC and DC Three Cable Wiring

Three cable wiring 115/116 are HV DC, and 117 AC three phase HV cable is the physical connection between high voltage batteries 103 and 104 to the intelligent battery module discharge/recharge (IBM-D/R) 102. This delivers the needed high voltage output distributed from module 102 being supplied to dual drive motor 101. Furthermore, when 102 determines which battery is driving dual drive motor 101 it then supplies charging to 103 or 104 respectively.

Dual Drive Motor (DDM)

Dual drive motor 101 is responsible for the drive torque of the rear wheels, also for energy recovery harvesting under off-throttle applications (e.g., Removing foot off pedal). For example: when releasing throttle, alternating current is recovered, depending on the rate of deceleration (slowing down) of vehicle.

Receives precision commands from the IBM-D/R 102, to drive vehicle.

Intelligent Battery Module Recharge (IBM-R)

Intelligent battery module recharge 105 in FIG. 2 is responsible for dynamically monitoring the output of the generator 106, and responsible for dynamically commanding and controlling the CVT 107 output ratio through communications on harness 111, to determine the appropriate needed charge rate from the generator 106, communicating with Intelligent battery module discharge/recharge 102 to verify batteries (SOC). Module 105 receives wireless speed data from all four Bluetooth wheel speed sensor (109a, 109b, 109c, 109d) from Bluetooth (BT) receiver 121. Also integrated a low voltage conversion module 123 that is possible to convert high voltage AC current to 12 v DC conversion. Module 123 provides 12 v supply to dashboard 114, vehicle accessories and to vehicle main body harness and/or Body control module. Low voltage conversion module 123 can convert voltage to 12 v or 24 v.

Detailed Description of Heavy Duty Application (HD-URD}

Embodiment 2

FIG. 12 describes heavy duty application (embodiment 2) with the 24-volt URD logic applied to long distance, high gross vehicle weight (GVW) transportation rigs, the combination of the original URD design and the newly designed front CVPP 1201 can be implemented to these heavy-duty chassis.

As stated in original URD designs the dual electric drive motors, mated to the two rear drive axles. Drive axle one will be directly powered by one heavy duty dual drive electric motor 1206. Drive axle two will have power distributed to the rear axle wheels via conventional ring and pinion super duty electric differential 1208 which receives its power from the second super duty drive motor 1207.

In heavy duty applications, URD design will be comprised of; CVPP 1201 mounted at front axle working in conjunction with IBM-R 1202 and heavy-duty drive motor 1206. Two, LI or SSB high voltage DC battery packs 1203 and 1204 with 24-volt integration. And a conventional ring and pinion super duty electronic differential 1208 with power being provided by super duty drive motor 1207.

In FIG. 12 Drive motor will achieve its standard capable range of 300 or more miles by consuming its fully charged battery assembly 1203, the battery assembly 1204 is being charged or maintained until battery 1203 reaches its lowest state of charge. With around 10% battery charge remaining our URD system Intelligent Battery Module Recharge (IBM-R) 1202 will automatically engage seamlessly battery 1204 to continue driving the heavy-duty vehicle as charging process for the next 300 miles, with about 3 hours of continuous charging at ranges of driving between 35 to 65 miles an hour. This process will repeat itself until the physical life of the batteries is achieved, this makes our invention as an unlimited range drive (URD) system.

At local speeds below 35 mph (1 to 35 mph) front installed continuous variable continuous variable power plant (CVPP) 1201 will adjust recharge rate of internal power source by adjusting its gear ratios and allowing higher charging rates at lower speeds. One such example being, when vehicle speed is at 10 mph the gear ratios will set to continue re-generating the energy at higher RPM through its electrical source, this way CVPP 1201 continuously adjust higher charging to lower vehicle speeds, at higher vehicle speeds the CVPP 1201 will adjust its gear ratio to provide lower RPM to its power source.

Depending on the batteries state of charge, the IBM-R 1202 will determine the needed output of the CVPP 1201 and control the ratio of the CVPP gearing assembly. The batteries charging and discharging information is transmitted to the dashboard 1211 through Bluetooth communication module which integrated with 1202. Vehicle speed is also transmitted to the dashboard 1211 via Bluetooth from wireless speed sensors 1209a, 1209b, 1209c and 1209d to the IBM-R 1202 that feeds to the dashboard 1211.

Furthermore, the third drive axle setup which includes super duty drive motor 1207 and super duty E-differential 1208 allows total disconnection of drive axle three when tractor unit is in use by itself with no semi-trailer (cargo load). This is achieved by way of high voltage electrical disconnection commanded by IBM-D/R 1205. The tractor unit would be solely driven by drive axle two and its heavy-duty dual drive motor 1206 with recharge capabilities from the front mounted HD-CVPP.

The advantage of disconnecting axle three logic is to reduce coefficient of drag in the driveline and to reduce energy consumption. In comparison to the combined assemblies which define the HD-CVPP, the SD-DOM of FIG. 15 will be combined with the E-Differential of FIG. 16 to create the new component, identified as the Electronic Power Differential (EPD) of FIG. 21 through FIG. 24.

Individual components in FIG. 12 are described below with their functionality:

Description for CVPP

FIG. 9 describes continuous variable power plant (CVPP). CVPP dynamically adjusts gearing to provide necessary rotational output to the built-in generator assembly to produce electricity to charge system batteries. Linked to the drive axles, the CVPP drive shaft input 904 is rotated to gear mechanism inside the CVPP shell 901. The continuous variable power plant gearing 902 are rotated to change gear ratio of the assembly, to create a movement to the generator stator and finally produce electricity. Part of our URD system, cooling down of the system is performed by feeding cooled water through the watery delivery pipe 130. RPM conversion mechanism 905 is composed of different size gears to provide different ratios of rotational movement of the generator shaft. Communication line 111 to IBM 105 provide and receives commands to adjust the rotational speed requirements of the stator inside the generator. Electrical circuit board 907 is responsible for providing communication of the CVPP to intelligent battery module 105. Stator shaft 906 when in rotation produces an inductive electrical field to produce three phase high voltage electricity. Three phase high voltage electricity is carried by the three phase high voltage cables 125. 903 represent the electrical source area of the CVPP assembly harvested by 908 assembly hardware. Newly created CVPP design eliminates the necessity to stop to recharge your HV vehicle battery or batteries.

With the addition CVPP to all vehicle chassis from light economy vehicle to light duty trucks, semi-truck trailers, autonomous vehicles, and finally electric vehicle (EV) race cars. The robust HV recharge capabilities of the CVPP are highly adaptable. The CVPP can be built to suit the demand for recharge requirements under high load capacities and high energy consumption units; to EV race systems that demand high recharge rates for shorter periods of time. The CVPP intention can be coupled to other electric vehicle chassis and drive line designs, for example usage for rear wheel drive and/or front wheel drive.

Heavy Duty High Voltage Battery 1 (HD-HVB1)

High voltage battery 1203 with operating capabilities of 640 volts, Lithium ion or solid state direct current batteries. Constructed with military grade carbon fiber construction, for structural rigidity and weight saving. High voltage battery is made up of 25 cell pack with 8 individual cells per pack. With specification of a nominal voltage of 3.2 volts per individual cell. Further internal components of the HV battery are comprised of temperature and humidity sensors and voltage and current sensors; coolant input and output delivery pipes and a main HV battery service disconnect plug for safe battery servicing. Batteries cells packs configuration can vary based on manufactures design and highest voltage needed.

High Voltage Battery 2 (HD-HVB2)

High voltage battery 1204 with operating capabilities of 640 volts, Lithium ion or solid state direct current batteries. Constructed with military grade carbon fiber construction, for structural rigidity and weight saving. High voltage battery is made up of 25 cell pack with 8 individual cells per pack. With specification of a nominal voltage of 3.2 volts per individual cell. Further internal components of the HV battery are comprised of temperature and humidity sensors and voltage and current sensors; coolant input and output delivery pipes and a main HV battery service disconnect plug for safe battery servicing. Batteries cells packs configuration can vary based on manufactures design and highest voltage needed.

Bluetooth Wheel Speed Sensor (A-D)

Bluetooth wheel speed sensor 1209*a*, 1209*b*, 1209*c*, 1209*d* monitors the rotation speed of all four wheels, providing crucial information to the Bluetooth Receiver 1221, then communicating this information to the intelligent battery module 1202 to adjust the ratio output of the CVPP assembly 1201, that affect the generating output of the high voltage generator side of CVPP 1201. The dashboard 1211 feeds of this data and provide a visual information of vehicle speed.

HD-CVPP Various Speeds/Various State of Charge Output

For speeds of 55 mph and above up to legal speeds and batteries at 90% state of charge, power source of CVPP 1201 needed output will be at its lowest capabilities of about 5-25 amps as the power source's stator shaft speed will be between 500-900 RPM, which is mated to the conversion mechanism 1305 of the CVPP 1301. For speeds of 15 mph and batteries at 10% state of charge, power source of CVPP 1201 needed output will be at its highest capabilities of about 75-125 amps as the power source's stator shaft speed will be between 5000-9000 RPM, which is mated to the conversion mechanism 1305 of the CVPP 1301. IBM-R 1202 will always monitor charging rate of batteries 1203 and 1204, under all speeds and automatically determines to charge or not to charge batteries.

For speeds of 55 mph and above up to legal speed and batteries at 90% state of charge, CVPP 1201 drive needed output will be at its lowest gear ratio adjusting the power source's idle between 500-900 RPM of the stator in the power source side of HD-CVPP 1301, mated to the conversion mechanism 1305 of the CVPP 1301. For speeds of 15 mph and above up to legal speed and batteries at 10% state of charge, CVPP 1201 drive needed output will be at its highest gear ratio adjusting the power source's idle between 5000-9000 RPM of the stator in the power source side of HD-CVPP 1301, mated to the conversion mechanism 1305 of the CVPP 1301. IBMR 1202 will always monitor charging rate of batteries 1203 and 1204, under all speeds and automatically determines to charge or not to charge batteries. FIG. 20 shows relations and calculations of vehicle speeds, state of charge and RPM output of the HD-CVPP.

Intelligent Battery Module Recharge (IBM-R)

Intelligent Battery Module 1202 is responsible for monitoring the output of the power source's side of CVPP 1201, and responsible for commanding and controlling the CVPP 1201 output ratio to determine the appropriate needed charge rate from the power source's side of CVPP 1201. Communicating with Intelligent battery module discharge/recharge 1205. It also monitors the usage of wired charging port 1210 at home or supplied with vehicle. It also monitors and controls the physical connection of wired plugin adaptor 1210 charge port. In addition, module 1202 receives speed data from Bluetooth wheel speed sensors 1209*a*, 1209*b*, and 1209*c* and 1209*d*.

DC Three Cable Wiring

The three-cable wiring 1212/1213 is the physical connection between high voltage batteries 1203 and 1204 to the intelligent battery module 1202. This delivers the needed high voltage current from module 1202 being supplied from power source side of CVPP 1201. Furthermore when 1202 determines that battery 1203 is fully charge then it supplies charging to 1204 and vice versa.

Intelligent Battery Module Discharge/Recharge (IBM-D/R)

Intelligent battery module 1205 is responsible for monitoring the State of Charge (SOC) of both batteries 1203 and 1204. It is responsible for communications to IBMR 1202 to provide batteries (SOC). Automatically selects which battery 1203 or 1204 is best suited for use with super duty drive motor 1207, depending on the batteries state of charge. Commands and monitors the output of the super duty drive motor 1207 and controls its off-throttle energy recovery capabilities of the super duty drive motor 1207. When there is no cargo load (semi-trailer), IMBD-R will command high voltage electrical disconnection to super duty drive motor 1207. Also monitors the wireless wheel speed data from the Bluetooth wheel speed sensor 1209C and wireless Bluetooth wheel speed sensor 1209D, to determine which rear wheel needs more traction left or right, depending on weather conditions, surrounding environment and road conditions.

Three Cable Wiring

This is the physical connection of the three-phase wiring 1215/1216 which are DC HV connection between high voltage batteries 1203 and 1204 to the intelligent battery module 1205. 1217A/1217B are AC HV connections that delivers the needed AC high voltage output distributed from module 1205 being supplied to super duty drive motor 1207 and delivering its energy to super duty E—differential 1208. Furthermore, when 1205 determines which battery is driving super duty drive motor 1207 it then supplies charging to 1203 or 1204 respectively.

HD Dual Drive Motor (HD-DDM)

The HD Dual Drive Motor is responsible for the drive torque of rear wheels, depending on the vehicle configuration. Also, for energy recovery systems under off-throttle applications (e.g., Removing foot off pedal). For example: when releasing throttle, alternating current is recovered, depending on the rate of deceleration (slowing down) of vehicle.

Receives precision commands from the IBMR/D 1205, to drive vehicle forward or backwards.

Light Duty Truck Urd Design

FIG. 17 describes continued expansion of our URD logic extends into the 12 volt or 24 volt, commercial and light duty trucks commonly referred to as Box Trucks (embodiment three). The combination of the original URD design and newly designed front CVPP can be implemented to these light duty chassis. As stated in original design a single electric drive motor (induction drive and inverter side) will drive an axle. In the case of the light duty trucks, this super duty drive motor 1707 will send electric drive rotation to the rear electronic differential 1708 via drive axle.

High Voltage Battery 1

High voltage battery 1703 with operating capabilities of 640 volts, Lithium ion or solid state direct current batteries. Constructed with military grade carbon fiber construction, for structural rigidity and weight saving. High voltage battery is made up of 25 cell pack with 8 individual cells per pack. With specification of a nominal voltage of 3.2 volts per individual cell. Further internal components of the HV battery are comprised of temperature and humidity sensors and voltage and current sensors; coolant input and output delivery pipes and a main HV battery service disconnect plug for safe battery servicing.

High Voltage Battery 2

High voltage battery 1704 with operating capabilities of 640 volts, Lithium ion or solid state direct current batteries. Constructed with military grade carbon fiber construction, for structural rigidity and weight saving. High voltage battery is made up of 25 cell pack with 8 individual cells per pack. With specification of a nominal voltage of 3.2 volts per individual cell. Further internal components of the HV battery are comprised of temperature and humidity sensors and voltage and current sensors, coolant input and output delivery pipes and a main HV battery service disconnect plug for safe battery servicing.

Intelligent Battery Module Recharge (IBM-R}

Intelligent battery module 1702 is responsible for monitoring the output of the generator 106, and responsible for commanding and controlling the CVPP 1701 output ratio to determine the appropriate needed charge rate from the generator side of CVPP 1701. Communicating with Intelligent battery module discharge/recharge 1705. It also monitors the usage of wired charging port 1710 at home or supplied with vehicle. It also monitors and controls the physical connection of wired plugin adaptor 110 charge port, in addition, it will monitor 1703 and 1704. Module 105 receives speed data from front Bluetooth wheel speed sensor 1709*a*, 1709*b*, 1709*c* and 1709*d*.

AC and DC Three Cable Wiring Harness

Harness 1712 and 1713 are the physical connection between high voltage batteries 1703 and 1704 to the intelligent battery module 1702. 1725 delivers the needed AC high voltage current from module 1702 being supplied from generator side of CVPP 1701. Furthermore, when 1702 determines that battery 1703 is fully charge then it supplies charging to 1704 and vice versa.

Intelligent Battery Module Discharge/Recharge (IBM-D/R}

Intelligent battery module 1705 is responsible for monitoring the State of Charge (SOC) of both batteries 1703 and 1704. It is Responsible for communications to IBM 1702 to provide batteries (SOC). And automatically selects which battery 1703 or 1704 is best suited for use with rear electric differential 1707, depending on the batteries state of charge. It commands and monitors the output of the super duty drive motor 1707 and controls its off-throttle energy recovery capabilities of the electric differential 1707. It also monitors the wireless wheel speed data from the Bluetooth wheel speed sensor 1709*c* and wireless Bluetooth wheel speed sensor 1709*d*, to determine which rear wheel needs more traction left or right, depending on weather conditions, surrounding environment and road conditions.

AC and DC Three Cable Wiring

Three cable harness 1715/1716 are the physical DC HV connection between high voltage batteries 1703 and 1704 to the intelligent battery module 1702. 1717 AC HV cable connection delivers he needed high voltage output distributed from module 1705 being supplied to super duty drive motor 1707. Furthermore, when 1705 determines which battery is driving super duty drive motor 1707 it then supplies charging to 1703 or 1704 respectively.

Super Duty Drive Motor

Super duty drive motor 1707 is responsible for the drive torque of the rear wheels, as well for energy recovery systems under off-throttle applications (e.g., removing foot off pedal). For example: when releasing throttle, alternating current is recovered, depending on the rate of deceleration (slowing down) of vehicle. Receives precision commands from the IBMR-D 1705, to drive vehicle forward or backwards.

Detailed Description of Light Duty Application

Embodiment 3

FIG. 17 describes light duty application (embodiment 3) with the 24-volt URD logic applied to long distance, gross vehicle weight up to 15,000 lbs (GVW), the combination of the original URD design and the newly designed front CVPP 1701 can be implemented to these light-duty chassis.

As stated in original URD designs the dual electric drive motors, differential mated to the two rear drive axles. Drive axle two will have power distributed to the rear axle wheels via conventional rings and pinions super duty electric differential 1708 which receives its power from the super duty drive motor 1707.

In light duty applications, URD design will be comprised of; CVPP 1701 mounted at front axle working in conjunction with IBM-D/R 1705 and light duty drive motor 1707. Two, LI or SSB high voltage DC battery packs 1703 and 1704 with 24-volt integration. And a conventional ring and pinion super duty electronic differential 1708 with power being provided by super duty drive motor 1707.

In FIG. 17 Drive motor will achieve its standard capable range of 300 or more miles by consuming its fully charged battery assembly 1703, the battery assembly 1704 is being charged or maintained until battery 1703 reaches its lowest state of charge. With around 10% battery charge remaining our URD system Intelligent Battery Module Recharge (IBM-R) 1702 will automatically engage seamlessly battery 1704 to continue driving the heavy-duty vehicle as charging process for the next 300 miles, with about 3 hours of continuous charging at ranges of driving between 35 to 65 miles an hour. This process will repeat itself until the physical life of the batteries, this makes our invention as an unlimited range drive (URD) system.

At local speeds below 35 mph (1 to 35 mph) front installed continuous variable continuous variable power plant (CVPP) 1701 will adjust recharge rate of internal power source by adjusting its gear ratios and allowing higher charging rates at lower speeds. One such example being, when vehicle speed is at 10 mph the gear ratios will set to continue re-generating the energy at higher RPM through its electrical source, this way CVPP 1701 continuously adjust higher charging to lower vehicle speeds, at higher vehicle speeds the CVPP 1701 will adjust its gear ratio to provide lower RPM to its power source.

Depending on the batteries state of charge, the IBM-R 1702 will determine the needed output of the CVPP 1701 and control the ratio of the CVPP gearing assembly. The batteries charging and discharging information is transmitted to the dashboard 1711 through Bluetooth communication module 1702. Vehicle speed is also transmitted to the dashboard 1211 via Bluetooth from wireless speed sensors 1709*a*, 1709*b*, 1709*c* and 1709*d* to the IBM-R 1702. Further, individual components in FIG. 17 are described below with their functionality Intelligent Battery Module Recharge (IBM-R)

IBM-R 1702 module is responsible for dynamically monitoring the output of the generator side of CVPP 1701, and responsible for dynamically commanding and controlling the CVPP 1701 output ratio through communications on harness 1711, to determine the appropriate needed charge rate from the generator side of CVPP 1701, communicating with Intelligent battery module discharge/recharge 1705 to verify batteries (SOC). Module 1702 receives wireless speed data from all four Bluetooth wheel speed sensor (1709*a*, 1709*b*, 1709*c*, 1709*d*) from BT receiver 1721. Also integrated a low voltage conversion module 1723 that is possible to convert high voltage AC current to 24 volts DC conversion. Module 1723 supplies 24 volts to vehicle accessories and to vehicle main body harness and/or Body control module.

Low Voltage Conversion Module (LVCM)

Low Voltage Conversion Module 1723 is responsible for collecting high voltage AC current from module 105 and converting it to a 24 volts DC supply. A remote positive and negative post located in either front or rear of vehicle for emergency module waking for under voltage conditions and diagnostic purposes.

Detailed Description of Motorsport Application

Embodiment 4

FIG. 18 describes motorsport application (Embodiment 4). Modern day motor sport cars are quickly evolving into all electric platforms with many new enterprises and ideas becoming a welcomed approach to the direction of electric vehicle racing. Including, present day, sanctioned race series that are facing a dilemma of their electric race cars depleting all HV battery capacity prior to the conclusion of the race.

With RP-CVPP's (Race Performance-CVPP) logic of variable ratios-to-recharge rates being fully adaptable and adjustable to current, all electric race cars. Race Performance CVPP (RP-CVPP) is the solution and an inevitable necessity for EV race cars to succeed in EV endurance racing. Further development options will consist of increased adaptability of our RP-CVPP design. For instance, in rear-wheel-drive race car platforms, the front axle will house a dual CVPP design. Whereas the left front wheel will drive one RP-CVPP unit and the right front wheel will drive another RP-CVPP unit. Under racing acceleration and race car applications for maximum speeds, the physical size of the RP-CVPP assembly unit will be drastically reduced. Each RP-CVPP assembly unit will be responsible for recharging an independent HV battery. The RP-CVPP consist of a higher electrical charging rate for racing purposes compared to the original URD design for racing purposes. FIG. 18 components (e.g., 1801) are equivalent to FIG. 13 (e.g., 1301) components but at race performance specifications. This logic can also be applied to Energy Recovery Hub (ERH, RP-ERH).

Electrical Auxillary Port Capabilities

Our URD system, optionally provides two AC outlets, one providing 110 v and one providing 220 v. The 110 v can be used to plug house appliances and the 220 v can be used with commercial power equipment. Also, the AC ports can be used for emergency situations, for example run a more powerful tire inflater on the 110 v, and for the 220 v application can be used for flood lightings during road repairs.

Other Applications

Our system is not limited to personal automobile vehicles. Application for commercial transportation will also apply, for example—Train, Bus, Autonomous vehicles, RV's and commercial vehicles, Grand Touring (GT) endurance race application with other features that can prolong the state of charge of the battery. Larger battery unit's application with possible triple system involved, for example, Commercial trucks, Trains, Recreational Vehicles (RV), and many others.

Computer Products

In view of this disclosure it is stated that the various system methods and devices described herein can be implemented in hardware, software, and firmware. Further, the various system methods and output parameters are included by way of example only and not in any limiting sense. In view of this disclosure, the ordinary skill in the art can apply the present teachings, while remaining within the scope of the invention. The functionality of one or more of the processors described herein may be incorporated into a fewer number or a single processing unit (e.g., a CPU) and may be Implemented using application specific integrated circuits (ASICs) or general-purpose processing circuits which are programmed responsive to executable instruction to perform the functions described herein.

The computer program product may include a computer readable storage medium (or media) having computer readable program instructions thereon for causing a computer processor to carry out aspects of the present invention. The computer readable storage medium can be a tangible or non-transitory device that can keep, retain, and store computer program instructions for use by a program instruction execution device. A computer readable storage medium is not to be construed as being transitory signals per se, such as radio waves or other freely propagating electromagnetic waves, electromagnetic waves propagating through a waveguide or other transmission media. The computer readable storage medium (or media) may be a non-transitory media that does not include a carrier wave or other propagated or modulated data signal.

The computer readable storage medium is for example, but is not limited to, a magnetic storage device, an optical storage device, an electromagnetic storage device, an electronic storage device, a semiconductor storage device, or any suitable combination of the foregoing. Specific examples of the computer readable storage medium include: a hard disk, a random-access memory (RAM), a read-only memory (ROM), an erasable programmable read-only memory (EPROM or Flash memory), a static random-access memory (SRAM), a memory stick, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

Although the present system may have been described with reference to an automotive vehicle it is also envisioned that the present system can be extended to other automotive applications such as light duty vehicles (e.g., cargo vans), heavy duty vehicles (e.g., Box Trucks), and high-performance vehicles (e.g., race cars). Further, the present system may also include one or more programs which may be used with standard automotive electric systems so that they may provide features and advantages of the present system.

Certain additional advantages and features of this disclosure may be apparent to those skilled in the art upon studying the disclosure or may be experienced by persons implementing the novel system and method of the present disclosure. Another advantage of the present systems and method may be that conventional automotive systems can be easily upgraded to incorporate the features and advantages of the present systems, devices, and methods.

It is to be appreciated that any one of the embodiments, examples or processes described herein may be combined and/or grouped with one or more other examples, embodiments and/or processes or be separated and/or performed amongst separate devices or device portions in accordance with the present devices, systems, and methods.

The above discussion is intended to be merely illustrative of the present systems, method, and devices. It should not be construed as limiting the appended claims to any embodiment or group of embodiments. Thus, while the present system has been described detail with reference to exemplary embodiments, it should also be appreciated that numerous modifications and alternative embodiments may be devised by those having ordinary skill in the art without departing from the broader and intended use and scope of the present system as set forth in the claims that follow. The specification and drawings are to be regarded in an illustrative manner and are not intended to limit the scope of the claims.

CONCLUSION

Based on the attached data in this document for patent, it can be clearly stated that this URD invention will help facilitate a growth in the automotive electric vehicle industry. It will reduce fossil fuel dependency, provides lower emissions and cleaner environment. This invention can reduce the need of gas station uses, and also reduces the power drain from the residential infrastructure power grid. Further, the URD invention achieve Unlimited Range Drive (URD) capabilities which may exceed more than 1 million miles drive on a single high voltage battery charge, the invention provides cost effective solution for more than 1 million miles drive. Claims follows:

The invention claimed is:

1. A system, comprising of an intelligent battery module-recharge (IBM-R), an intelligent battery module-discharge/recharge (IBM-D/R), a heavy duty continuous variable power plant (HD-CVPP), a heavy duty dual drive motor (HD-DDM), a super duty electronic differential (SD E-Diff), an independent Super duty drive motor (SD-DDM), a high voltage battery pack one (BAT1), a high voltage battery pack two (BAT2), a tractor cabin unit without a loaded cargo trailer (tractor unit), and the system further comprising:

one or more processors, one or more memories, and one or more sensors;

the intelligent battery module-discharge/recharge (IBM-D/R) receives request from the tractor unit based on an accelerator pedal action to deliver high voltage current to the heavy duty dual drive motor (HD-DDM) which causes wheels of the tractor unit to propel forward or reverse;

the IBM-D/R reads a state of charge (SOC) of the BAT1 and the BAT2 dynamically, and determines which of the BAT1 or BAT2 has the highest SOC for use, and which of the BAT1 or BAT2 needs to recharge by the lowest SOC;

the IBM-D/R shares the SOC to the intelligent battery module-recharge (IBM-R) to determine recharge requirements and then the BM-R sends commands to the heavy duty continuous variable power plant (HD-CVPP);

the HD-CVPP rotates via an axle shaft from the tractor unit propulsion and varies output gear ratio to generate variable high voltage alternating current (AC), wherein the HD-CVPP supply high voltage alternating current to the IBM-R where the high voltage alternating current is converted to high voltage direct current (DC), wherein DC is transmitted to charge the BAT1 or BAT2 that has been depleted under commands of the intelligent battery module-discharge/recharge (IBM-D/R);

the IBM-R and the IBM-D/R feedbacks the tractor unit operational parameters to one other, and the IBM-R commands the HD-CVPP to change high voltage output based on the tractor unit operational parameters;

wherein the IBM-D/R dynamically determines which of the BAT1 or BAT2 has the higher state of charge (SOC), and automatically perform the BAT1 or BAT2 switching; and the IBM-R receives the BAT1 and the BAT2 status information dynamically, and transmits the status information to a dashboard display.

2. The system of claim 1, wherein the dashboard displays operational parameters comprising:

the tractor unit speed, the BAT1 and the BAT2 SOC, the BAT1 and the BAT2 nominal voltages and temperature, remaining travel distance on battery being used, occupant infotainment information, interior climate control, radio sources, interior options including lighting, comfort seat settings, date and time, navigational application, and communication links.

3. The system of claim 1, wherein the HD-CVPP rotates via the axle shaft from the tractor unit propulsion and varies gear ratio according to the recharge requirements, adjusts the HD-CVPP output and generates variable three phase high voltage alternating current, wherein high voltage current transmits to the IBM-R using a heavy duty three phase high voltage harness.

4. The system of claim 1, wherein the HD-CVPP reads commands from the IBM-R and the HD-CVPP outputs high voltage current to the IBM-R.

5. The system of claim 1, wherein the HD-DDM recovers off throttle high voltage alternating current and delivers to the IBM-D/R where high voltage alternating current is converted to high voltage direct current and supply back to the BAT1 or BAT2 in use at that time.

6. The system of claim 1, wherein the BAT1 or BAT2 that is at a lower SOC receives high voltage direct current from the IBM-R, wherein high voltage DC transmits to the BAT1 or BAT2 using a heavy duty high voltage direct current harness.

7. The system of claim 1, wherein an auxiliary wired charging port (AP2) supply high voltage energy to the BAT1 or BAT2 when the tractor unit not in use.

8. The system of claim 1, wherein the auxiliary wired charging port (AP2) supply low voltage energy to a 24-volt system battery when the tractor unit not in use.

9. The system of claim 1, wherein the IBM-R commands to the HD-CVPP and adjusts gear ratio and output three-phase high voltage alternating current.

10. The system of claim 1, wherein the IBM-R receives high voltage alternating current from the HD-CVPP, wherein the high voltage alternating current is three phase current, wherein the IBM-R converts the high voltage alternating current to high voltage direct current and supply back to the BAT1 or BAT2.

11. The system of claim 1, wherein the IBM-D/R commands the HD-DDM for drive power, wherein the HD-DDM recovers off throttle energy, wherein the IBM-D/R dynamically monitors the SOC of the BAT1 or BAT2 and converts high voltage AC to high voltage DC while receives feedback from the IBM-R.

12. The system of claim 1, wherein a low voltage conversion module (LVCM) is a low voltage control module responsible to supply 24-volts to the IBM-R and the IBM-D/R for initial key on power supply, and to a 24-volt cooling circuit and associated 24-volt components.

13. The system of claim 1, wherein the high voltage of the BAT1 or BAT2 is high voltage direct current assembly and is constructed using lithium-ion state or solid-state battery technology with a maximum system voltage of 640 volts or higher volts.

14. The system of claim 1, wherein wireless speed sensors are located at first and second axles wheels and communicates wheel speed to the IBM-R.

15. A system comprising of an intelligent battery module-recharge (IBM-R), an intelligent battery module-discharge/recharge (IBM-D/R), a heavy duty continuous variable power plant (HD-CVPP), a heavy duty dual drive motor (HD-DDM), a super duty electronic differential (SD E-Diff), an independent super duty drive motor (SD-DDM), a high voltage battery pack one (BAT1), a high voltage battery pack two (BAT2), a tractor cabin unit with a loaded cargo trailer (tractor unit), the system further comprising:

one or more processors, one or more memories, and one or more sensors;

the intelligent battery module-discharge/recharge (IBM-D/R) receives request from the tractor unit based on an accelerator pedal action to deliver high voltage energy to the heavy duty dual drive motor (HD-DDM) which causes wheels of the tractor unit to propel forward or reverse;

the HD-DDM recovers off throttle high voltage alternating current (AC) and delivers AC to the IBM-D/R where high voltage alternating current is converted to high voltage direct current (DC) and supply back to the BAT1 or BAT2 in use;

the IBM-D/R reads a state of charge (SOC) of the BAT1 or BAT2, and decides which of the BAT1 or BAT2 needs to recharge by the lowest SOC;

the IBM-D/R shares the SOC to the intelligent battery module-recharge (IBM-R) to determine recharge requirements, and then the IBM-R sends commands to the heavy duty continuous variable power plant (HD-CVPP);

the HD-CVPP rotates via an axle shaft from the tractor unit propulsion and varies output gear ratio, and spins the HD-CVPP generator mechanism to generate variable high voltage alternating current, and transmitted to the IBM-R where the high voltage alternating current is converted to high voltage direct current, and the high voltage direct current transmitted to the BAT1 or BAT2 that has been depleted under commands of the intelligent battery module-discharge/recharge (IBM-D/R);

the IBM-R and the IBM-D/R feedbacks the tractor unit operational parameters to one other, and the IBM-R commands the HD-CVPP to adjusts high voltage output based on the tractor unit operational parameters, wherein output high voltage current supply to recharge the BAT1 or BAT2;

wherein the IBM-D/R dynamically determines which of the BAT1 or BAT2 has the higher state of charge (SOC) and automatically perform the BAT1 or BAT2 switching; and the IBM-R receives the BAT1 and the BAT2 status information dynamically, and transmits the status information to a dashboard display.

16. The system of claim 15, wherein the IBM-D/R receives commands from a depressed accelerator pedal to deliver high voltage current to the HD-DDM, wherein the HD-DDM provides energy to wheels of the tractor unit to propel forward or backward.

17. The system of claim 15, wherein when cargo load engaged on the tractor unit then supplemental drive power deliver to the Electronic Power Differential (EPD).

18. The system of claim 15, wherein the IBM-D/R dynamically determines which of the BAT1 or BAT2 has higher state of charge (SOC), and automatically perform the BAT1 or BAT2 switching to supply higher voltage energy to the HD-DDM which results in an extended drive on an initial battery charge of the BAT1 or BAT2.

19. A method comprising of an intelligent battery module-recharge (IBM-R), an intelligent battery module-discharge/recharge (IBM-D/R), a heavy duty continuous variable power plant (HD-CVPP), a heavy duty dual drive motor (HD-DDM), an Electronic Power Differential (EPD), a high voltage battery pack one (BAT1), a high voltage battery pack two (BAT2), a tractor cabin (tractor unit), the method further comprising:

the intelligent battery module-discharge/recharge (IBM-D/R) receives request from the tractor unit based on an accelerator pedal action to deliver high voltage AC to the heavy duty dual drive motor (HD-DDM) which causes wheels of the tractor unit to propel forward or reverse;

the HD-DDM recovers off throttle high voltage alternating current and delivers to the IBM-D/R where high voltage alternating current (AC) is converted to high voltage direct current (DC) and supply back to the BAT1 or BAT2 in use;

the IBM-D/R reads a state of charge (SOC) of the BAT1 and the BAT2 dynamically, and determines which of the BAT1 or BAT2 has the highest SOC for use; and which of the BAT1 or BAT2 needs to recharge by the lowest SOC;

the IBM-D/R shares the SOC to the IBM-R to determine recharge requirements, and then the IBM-R sends commands to the heavy duty continuous variable power plant (HD-CVPP);

the HD-CVPP rotates via an axle shaft from the tractor unit propulsion and varies output gear ratio to generate variable high voltage alternating current and transmitted to the IBM-R where high voltage alternating current is converted to high voltage direct current, and high voltage direct current supply to the BAT1 or BAT2 that has been depleted under commands of the intelligent battery module-discharge/recharge (IBM-D/R);

the IBM-R and the IBM-D/R feedbacks the tractor unit operational parameters to one other, and the IBM-R commands the HD-CVPP to adjusts high voltage output based on the tractor unit operational parameters, wherein output high voltage current supply for recharging the BAT1 or BAT2 controlled by the IBM-R;

wherein the IBM-D/R dynamically determines which of the BAT1 or BAT2 has the higher state of charge (SOC) and automatically perform the BAT1 or BAT2 switching; and the IBM-R receives the BAT1 and the BAT2 status information dynamically, and transmits the status information to a dashboard display.

20. The method of claim 19, wherein the Electric Power Differential unit (EPD) provides maximum torque under the tractor unit load configuration either with or without a cargo trailer.

* * * * *